(12) United States Patent
Kim et al.

(10) Patent No.: US 6,516,238 B1
(45) Date of Patent: Feb. 4, 2003

(54) SEMICONDUCTOR FACTORY AUTOMATION SYSTEM AND METHOD FOR TRANSPORTING SEMICONDUCTOR WAFERS

(75) Inventors: Jin-Sun Kim, Ichon-shi (KR); Moon-Gi Kim, Ichon-shi (KR); Chang-Kee Hong, Ichon-shi (KR); Tae-Ho Lee, Ichon-shi (KR); Won-Soo Cho, Ichon-shi (KR); Yung-Hwan Chae, Ichon-shi (KR); Woo-Kyu Lee, Ichon-shi (KR); Jong-Mo Ahn, Ichon-shi (KR); Kwang-Ho Lee, Ichon-shi (KR)

(73) Assignee: Hyundai Electronics Industries Co., Ltd., Ichon (KR)

( * ) Notice: Subject to any disclaimer, the term of this patent is extended or adjusted under 35 U.S.C. 154(b) by 0 days.

(21) Appl. No.: 09/576,418

(22) Filed: May 22, 2000

(30) Foreign Application Priority Data

| May 20, 1999 | (KR) | 99-18270 |
| Jun. 22, 1999 | (KR) | 99-23547 |
| Jun. 22, 1999 | (KR) | 99-23548 |
| Jun. 30, 1999 | (KR) | 99-25868 |
| Jun. 30, 1999 | (KR) | 99-25981 |

(51) Int. Cl.$^7$ .................................... G06F 19/00
(52) U.S. Cl. ................. 700/112; 700/113; 700/121
(58) Field of Search .................. 700/112, 113, 700/121

(56) References Cited

U.S. PATENT DOCUMENTS

| 4,571,685 A | 2/1986 | Kamoshida ............... 364/468 |
| 4,901,242 A | 2/1990 | Kotan .......................... 364/468 |
| 5,111,404 A | 5/1992 | Kotani ......................... 364/468 |
| 5,231,585 A | 7/1993 | Kobayashi et al. ......... 364/468 |
| 5,262,954 A | 11/1993 | Fujino et al. ............... 364/468 |
| 5,373,451 A | 12/1994 | Furukawa |
| 5,375,062 A | 12/1994 | Aoki ............................ 364/468 |
| 5,381,339 A | * 1/1995 | Yoko et al. ................. 700/112 |
| 5,402,349 A | 3/1995 | Fujita et al. ................ 364/468 |
| 5,403,143 A | * 4/1995 | Ito ................................ 414/352 |
| 5,440,493 A | * 8/1995 | Doida .......................... 700/99 |
| 5,495,417 A | 2/1996 | Fuduka et al. .............. 364/468 |
| 5,555,179 A | 9/1996 | Koyama et al. ............. 364/468 |
| 5,568,408 A | 10/1996 | Maeda ......................... 364/580 |
| 5,579,231 A | 11/1996 | Sudou et al. ............. 364/468.01 |
| 5,584,118 A | 12/1996 | Furukawa et al. |
| 5,596,712 A | 1/1997 | Tsuyama et al. ........ 395/183.02 |
| 5,997,169 A | * 12/1999 | Watanabe et al. ........... 700/115 |
| 6,157,866 A | * 12/2000 | Conboy et al. ............. 414/940 |
| 6,272,437 B1 | * 8/2001 | Woods et al. ............... 700/110 |
| 6,314,332 B1 | * 11/2001 | Kida ............................ 700/113 |

FOREIGN PATENT DOCUMENTS

| JP | WO92/11114 | 7/1992 | ......... B23P/21/00 |
| JP | 6271022 | 9/1994 | ......... B65G/1/137 |
| JP | 6286824 | 10/1994 | ......... B65G/1/137 |
| JP | 10303270 | 11/1998 | ......... H01L/21/68 |

* cited by examiner

Primary Examiner—Leo Picard
Assistant Examiner—Alexander Kosowski
(74) Attorney, Agent, or Firm—Jacobson Holman PLLC

(57) ABSTRACT

A method for transporting semiconductor wafers in semiconductor factory automation system, includes the steps of: a) processing a lot of semiconductor wafers to be contained in a semiconductor wafer cassette in a process equipment; b) sending a cassette transportation request from the process equipment to a cell management server when the process equipment has processed the lot of semiconductor wafers; c) generating a transportation instruction in response to the cassette transportation request; and d) if the semiconductor wafer cassette is transported from the process equipment to a stocker by an automatic guide vehicle (AGV), simultaneously activating the AGV and the stocker by simultaneously sending the transportation instruction to the AGV and the stocker. The method in accordance with the present invention can reduce a time taken to transport the semiconductor wafers.

25 Claims, 24 Drawing Sheets

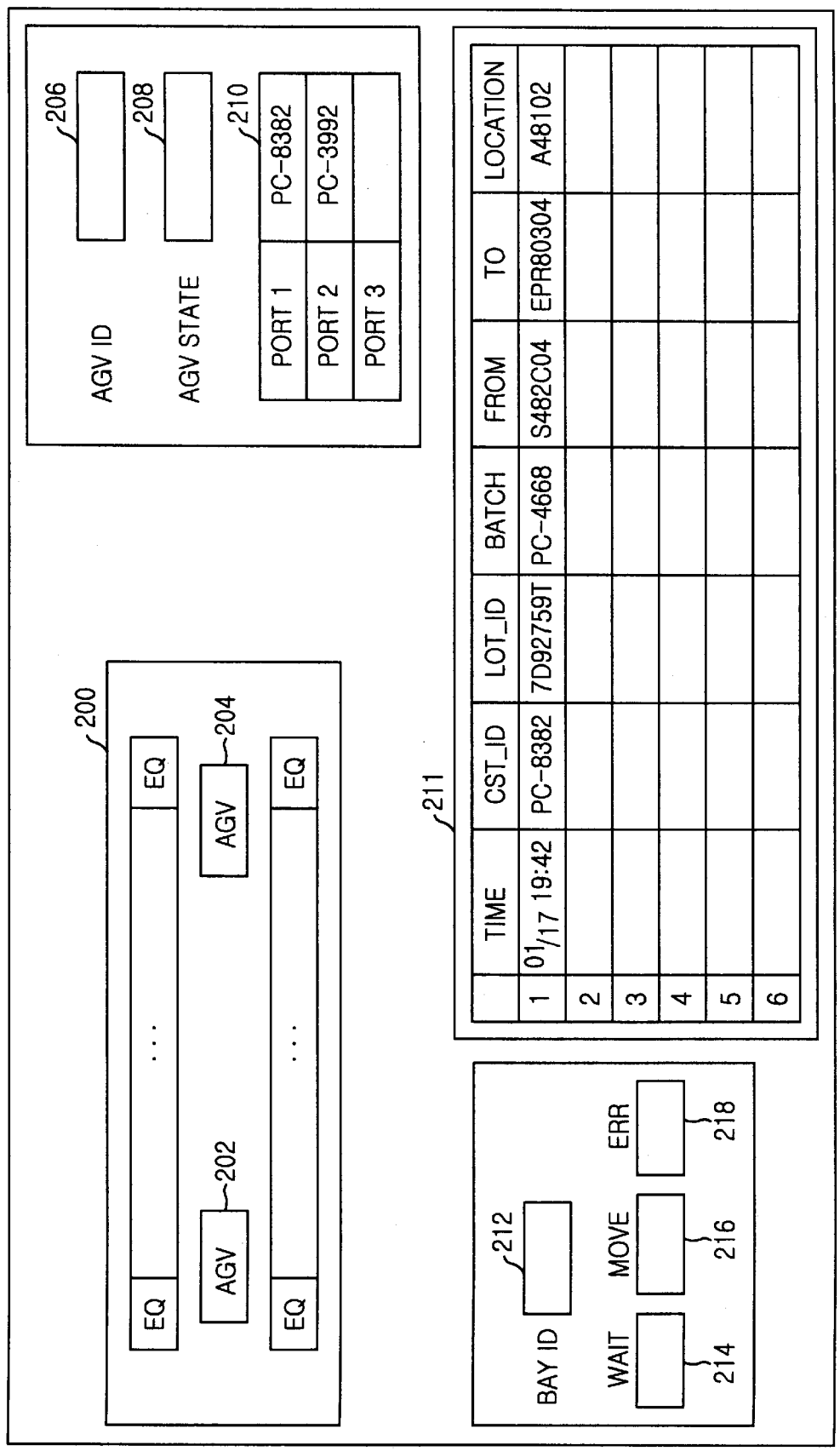

SEMICONDUCTOR FACTORY AUTOMATION SYSTEM AND METHOD FOR TRANSPORTING SEMICONDUCTOR WAFERS

FIELD OF THE INVENTION

The present invention relates to a semiconductor factory automation (FA) system; and, more particularly, to a semiconductor FA system and method for transporting semiconductor wafers.

DESCRIPTION OF THE PRIOR ART

Generally, a conventional semiconductor factory automation (FA) system automatically processes semiconductor wafers. The conventional semiconductor FA system includes process equipments, stockers and an automatic guide vehicle (AGV). A process equipment applies a semiconductor process to the semiconductor wafers. A stocker loads the semiconductor wafers to be processed in the process equipment. Further, the stocker loads the semiconductor wafers, which have been already processed in the process equipment. The AGV transports the semiconductor wafers from the process equipment to another process equipment. Further, the AGV transports the semiconductor wafers from the stocker to the process equipment. Furthermore, the AGV transports the semiconductor wafers from the process equipment to the stocker.

Where the semiconductor wafers processed in the process equipment are transported to another process equipment by the AGV, the AGV and another process equipment are sequentially activated. That is, after the AGV has been activated, the another process equipment is activated. Accordingly, where the AGV and another process equipment are sequentially activated, it takes much time to transport the semiconductor wafers from the process equipment to another process equipment by the AGV.

Similarly, where the semiconductor wafers loaded to the stocker are transported to the process equipment by the AGV, the AGV and the process equipment are sequentially activated. That is, after the AGV has been activated, the process equipment is activated. Accordingly, where the AGV and the process equipment are sequentially activated, it takes much time to transport the semiconductor wafers from the stocker to the process equipment by the AGV.

Similarly, where the semiconductor wafers processed in the process equipment are transported to the stocker by the AGV, the AGV and the stocker are sequentially activated. That is, after the AGV has been activated, the stocker is activated. Accordingly, where the AGV and the stocker are sequentially activated, it takes much time to transport the semiconductor wafers from the process equipment to the stocker by the AGV.

As a result, there is a problem that the conventional semiconductor FA system increases a time taken to transport the semiconductor wafers by the AGV.

SUMMARY OF THE INVENTION

It is, therefore, an object of the present invention to provide a semiconductor FA system and method for transporting semiconductor wafers that can reduce a time taken to transport the semiconductor wafers.

It is, therefore, another object of the present invention to provide a computer-readable media storing program instructions, the program instructions disposed on a computer to perform a method for transporting semiconductor wafers that can reduce a time taken to transport the semiconductor wafers.

In accordance with an aspect of the present invention, there is provided a semiconductor factory automation (FA) system, comprising: a common communication line; a plurality of process means for processing a lot of semiconductor wafers to be contained in a semiconductor wafer cassette, wherein one of said process means sends a cassette transportation request when the one of said process means has processed the lot of semiconductor wafers; an instruction generation means coupled to said common communication line for generating a transportation instruction in response to the cassette transportation request; a transportation control means coupled to said common communication line for controlling a semiconductor wafer cassette transportation in response to the transportation instruction; a plurality of transportation means for transporting the semiconductor wafer cassette, wherein said transportation means are controlled by said transportation control means; and a plurality of stocker means coupled to said transportation control means for loading the semiconductor wafer cassette, wherein said transportation control means simultaneously activates one of said transportation means and one of said stocker means by simultaneously sending the transportation instruction to the one of said transportation means and the one of said stocker means if the semiconductor wafer cassette is transported from the one of said process means to the one of said stocker means by the one of said transportation means.

In accordance with another aspect of the present invention, there is provided a method for transporting semiconductor wafers in semiconductor factory automation system, comprising the steps of: a) processing a lot of semiconductor wafers to be contained in a semiconductor wafer cassette in a process equipment; b) sending a cassette transportation request from the process equipment to a cell management server when the process equipment has processed the lot of semiconductor wafers; c) generating a transportation instruction in response to the cassette transportation request; and d) if the semiconductor wafer cassette is transported from the process equipment to a stocker by an automatic guide vehicle (AGV), simultaneously activating the AGV and the stocker by simultaneously sending the transportation instruction to the AGV and the stocker.

In accordance with further another aspect of the present invention, there is provided a computer-readable media storing program instructions, the program instructions disposed on a computer to perform a method for transporting semiconductor wafers in semiconductor factory automation system, comprising the steps of: a) processing a lot of semiconductor wafers to be contained in a semiconductor wafer cassette in a process equipment; b) sending a cassette transportation request from the process equipment to a cell management server when the process equipment has processed the lot of semiconductor wafers; c) generating a transportation instruction in response to the cassette transportation request; and d) if the semiconductor wafer cassette is transported from the process equipment to a stocker by an automatic guide vehicle (AGV), simultaneously activating the AGV and the stocker by simultaneously sending the transportation instruction to the AGV and the stocker.

BRIEF DESCRIPTION OF THE DRAWINGS

The above and other objects and features of the instant invention will become apparent from the following description of preferred embodiments taken in conjunction with the accompanying drawings, in which:

FIG. 2 depicts an operator interface screen provided by an operator interface server (OIS) shown in FIG. 1A;

DETAILED DESCRIPTION OF THE INVENTION

Figure 1A:
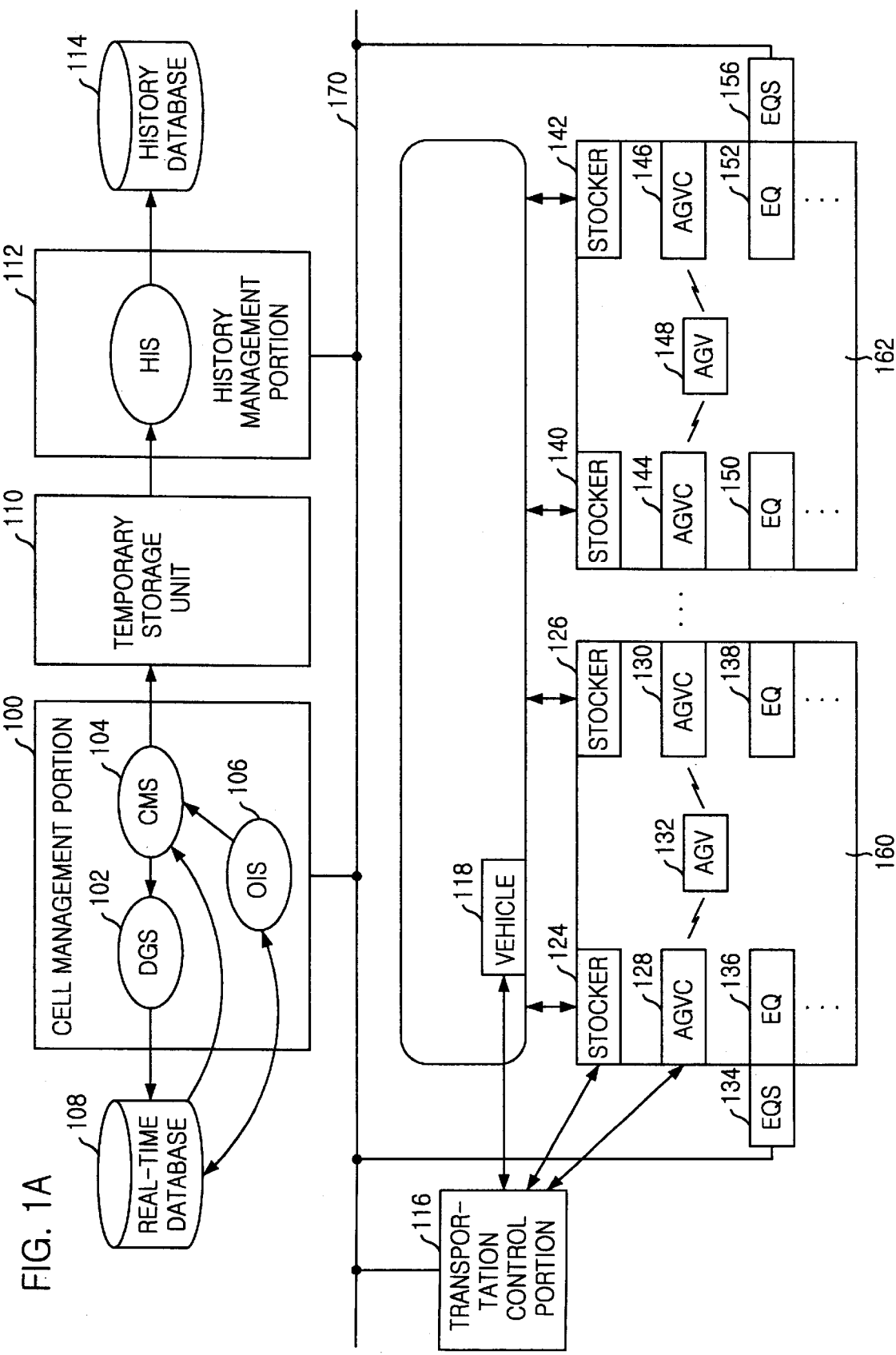
FIG. 1A is a block diagram showing a semiconductor factory automation (FA) system in accordance with the present invention.

Referring to FIG. 1A, there is shown a block diagram showing a semiconductor factory automation (FA) system in accordance with the present invention. As shown, the semiconductor factory FA system includes at least one cell which has a predetermined number, e.g., 4, of semiconductor production bays. A semiconductor production bay 160 or 162. The semiconductor production bay 160 is provided with process equipments (EQs) 136 and 138, stockers 124 and 126 and an automatic guide vehicle (AGV) 132. The semiconductor production bay 162 is provided with EQs 150 and 152, stockers 140 and 142 and an AGV 148. The EQ 136, 138, 150 or 152 processes semiconductor wafers in order to obtain semiconductor devices. The process equipment includes, e.g., an etching equipment, a photo-lithography equipment and the like. The stocker 124, 126, 140 or 142 temporarily stores a number of semiconductor wafer cassettes. Each of semiconductor wafer cassettes has a predetermined number of semiconductor wafers which is referred to as a lot. The semiconductor wafer cassettes are selectively transported to a process equipment (EQ) by using the AGV 132 or 148. The semiconductor wafer cassette stored in the stocker 124 is conveyed to another semiconductor production bay 162.

An equipment server (EQS) 134, 138 or 156 is coupled to a common communication line 170, e.g., Ethernet™ supplied by Xerox Corporation. AGV controllers (AGVCs) 128 and 130 control the AGV 132, respectively. AGVCs 144 and 146 control the AGV 148, respectively.

The semiconductor FA system also includes a cell management portion 100, a real-time database 108 connected to the cell management portion 100, a temporary storage unit 110, a history management portion 112 connected to the temporary storage unit 110 and a history database 114 connected to the history management portion 112. The cell management portion 100, the history management portion 112 and the history database 114 are respectively connected to the common communication line 170 for communication therebetween.

The cell management portion 100 includes a cell management server (CMS) 104, an operator interface server (OIS) 106 and a data gathering server (DGS) 102. The DGS 102 stores process data associated with the lot in the real-time database 108.

The EQ 136 sends a cassette transportation request when the EQ 136 has processed the lot of semiconductor wafers. The CMS 104 generates a transportation instruction in response to the cassette transportation request. If the semiconductor wafer cassette is transported from the EQ 136 to the stocker 124 or 126 by the AGV 132, a transportation control portion 116 simultaneously activates the AGV 132 and the stocker 124 or 126 by simultaneously sending the transportation instruction to the AGV 132 and the stocker 124 or 126.

The stocker 124 or 126 further sends the cassette transportation request to the AGV 132. If the semiconductor wafer cassette is transported from the stocker 124 or 126 to the EQ 136 by the AGV 132, the transportation control portion 116 further simultaneously activates the AGV 132 and the EQ 136 by simultaneously sending the transportation instruction to the AGV 132 and the EQ 136.

Furthermore, if the semiconductor wafer cassette is transported from the EQ 136 to the EQ 138 by the AGV 132, the transportation control portion 116 simultaneously activates the AGV 132 and the EQ 138 by simultaneously sending the transportation instruction to the AGV 132 and the EQ 138. The EQs 136 and 138 are positioned on the same semiconductor production bay 160 as each other.

A vehicle 118 transports the semiconductor wafer cassette between the semiconductor production bays 160 and 162. Still further, if the semiconductor wafer cassette is transported from the EQ-136 to the EQ 150, the transportation control portion 116 simultaneously activates the AGVs 132 and 148, the EQ 150 and the vehicle 118 by simultaneously sending the transportation instruction to AGVs 132 and 148, the EQ 150 and the vehicle 118. The EQs 136 and 150 are positioned on different semiconductor production bays to each other. The EQ 136 and the AGV 132 are positioned on a same semiconductor production bay 160 as each other. The EQ 150 and the AGV 148 are positioned on a same semiconductor production bay 162 as each other.

Figure 1B:
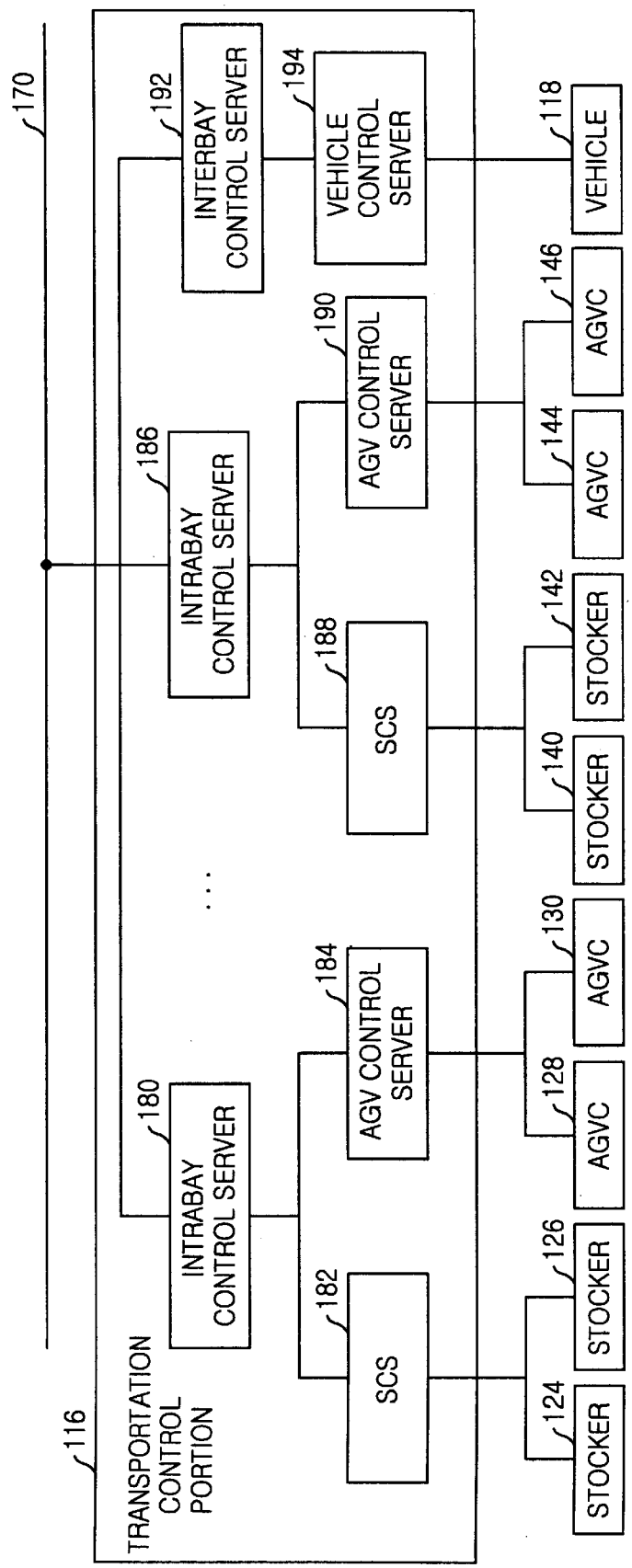
FIG. 1B is a block diagram illustrating a transportation control portion shown in FIG. 1A.

Referring to FIG. 1B, there is shown a block diagram illustrating a transportation control portion shown in FIG. 1A. As shown, the transportation control portion 116 includes intrabay control servers 180 and 186 coupled to the common communication line 170, an intrabay control server 192 coupled to the common communication line 170, SCSs 182 and 188, AGV control servers 184 and 190, a vehicle control server 194. The intrabay control servers 180 and 186 and the interbay control server 192 convert the transportation message to the transportation instruction, respectively. The SCSs 182 and 188 generate a stocker control signal to control the stockers 124, 126, 140 and 142 in response to the transportation instruction. The vehicle control server 194 generates a vehicle control signal in response to the transportation instruction. The AGV control server 184 sends the transportation instruction to the AGVC 128 or 130. The AGVC 128 or 130 generates an AGV control signal to control an AGV in response to the transportation instruction.

Referring to FIG. 2, there is depicted an operator interface screen provided by an operator interface server (OIS) shown in FIG. 1A. As shown, the operator interface screen includes a plurality of display portions. A display portion 200 displays position information of EQs and AGVs. The display portions 202 and 204 display error information of the AGVs as a color. A display portion 206 displays identification information of a selected AGV. A display portion 208 displays state information of the selected AGV. A display portion 210 displays identification of semiconductor wafer cassettes conveyed by the selected AGV. A display portion 212 displays identification information of a semiconductor production bay corresponding to the selected AGV. A display portion 214 displays the number of inactivated AGVs contained the semiconductor production bay. A display portion 216 displays the number of activated AGVs contained the semiconductor production bay. A display portion 218 displays the number of erroneous AGVs. A display portion 211 displays origination information of the semiconductor wafer cassette, destination information of the semiconductor wafer cassette, identification information of the semiconductor wafer cassette and current position information of the semiconductor wafer cassette contained in the selected AGV.

Figure 3:
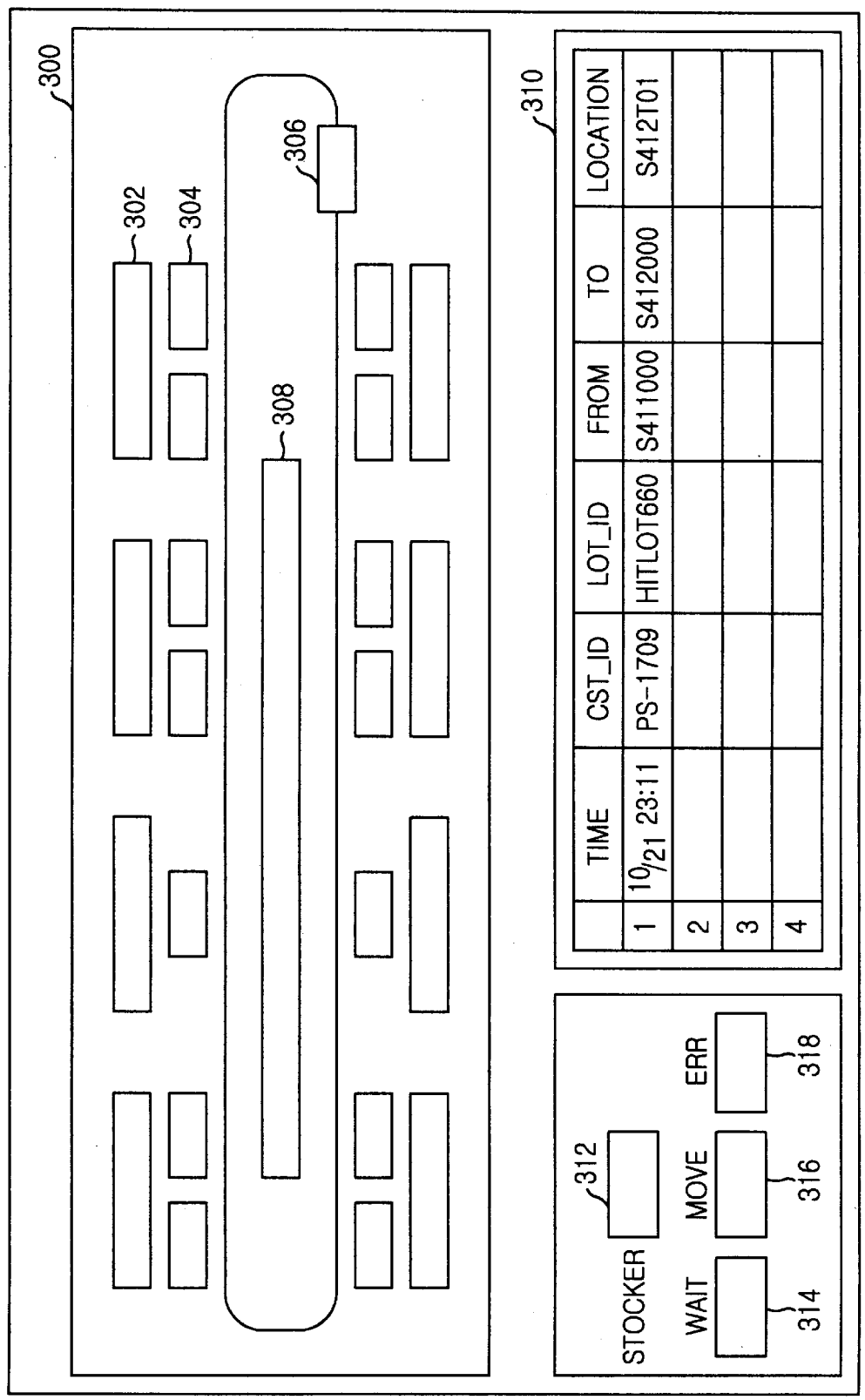
FIG. 3 depicts another operator interface screen provided by an operator interface server (OIS) shown in FIG. 1A.

Referring to FIG. 3, there is depicted another operator interface screen provided by an operator interface server (OIS) shown in FIG. 1A. As shown, a display portion 300 displays stockers 304, semiconductor production bays 302, semiconductor wafer cassette information 308 and a vehicle 306. The display portion 300 provides current position information of the vehicle 306. The display portion 310 displays schedule information of the semiconductor wafer cassette contained in the vehicle 306. A display portions 312, 314, 316 and 318 display the number of stockers, the number of inactivated stockers, the number of activated stockers and the number of erroneous stockers.

Figure 4:
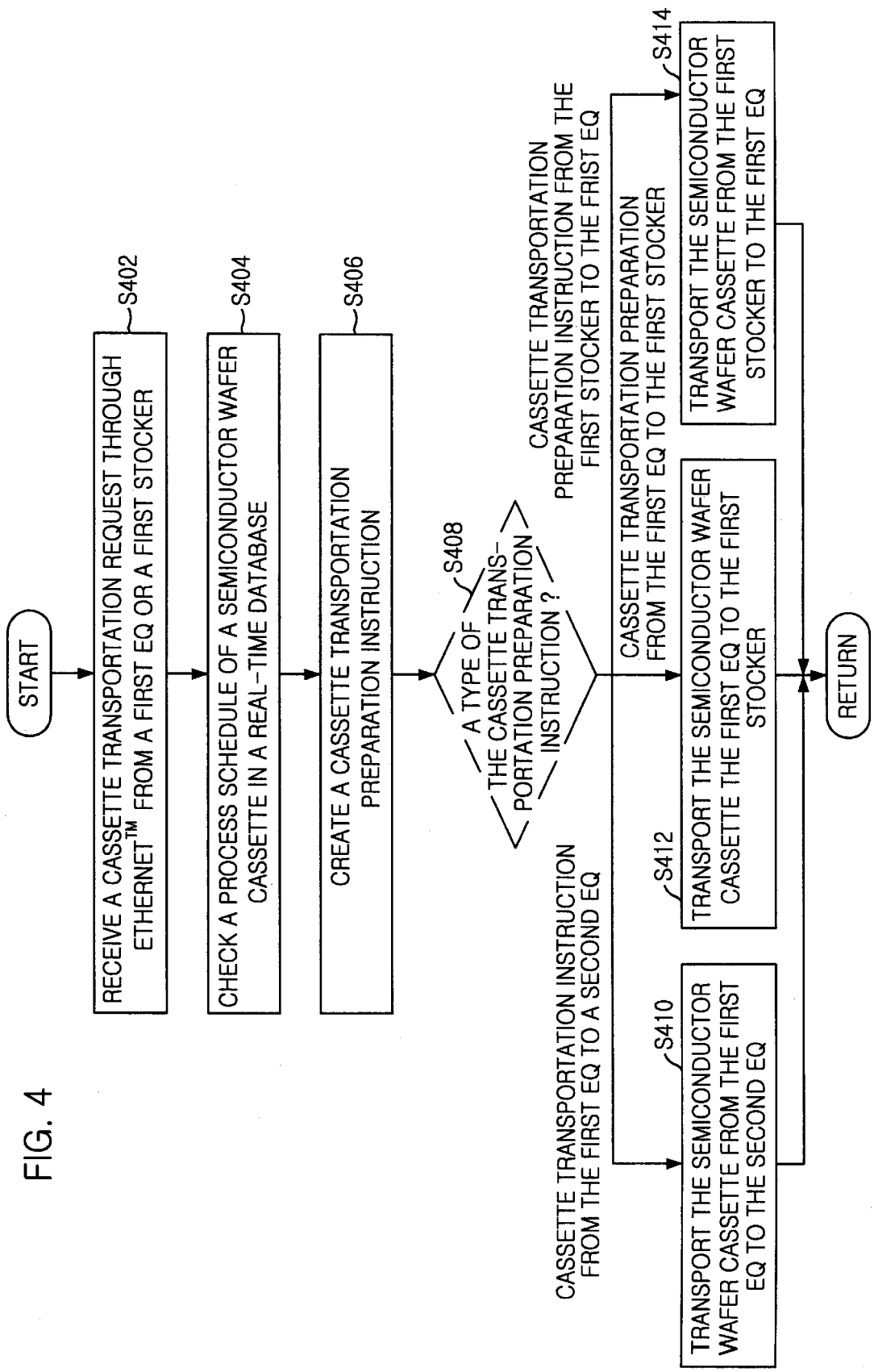
FIG. 4 is a flowchart showing a method for transporting a semiconductor wafer cassette in accordance with the present invention.

Referring to FIG. 4, there is shown a flowchart showing a method for transporting a semiconductor wafer cassette in accordance with the present invention.

At step S402, a CMS receives a cassette transportation request through Ethernet™ from a first EQ or a first stocker.

At step S404, the CMS checks a process schedule of a semiconductor wafer cassette in a real-time database.

At step S406, the CMS creates a cassette transportation preparation instruction.

At step S408, it is determined whether a type of the cassette transportation preparation instruction is related to transportation of the semiconductor wafer cassette from the first EQ to a second EQ, transportation of the semiconductor wafer cassette from the first EQ to the first stocker or transportation of the semiconductor wafer cassette from the first stocker to the first EQ.

At step S410, if the type of the cassette transportation preparation instruction is related to the transportation of the semiconductor wafer cassette from the first EQ to the second EQ, the semiconductor wafer cassette is transported from the first EQ to the second EQ.

At step S412, if the type of the cassette transportation preparation instruction is related to the transportation of the semiconductor wafer cassette from the first EQ to the first stocker, the semiconductor wafer cassette is transported from the first EQ to the first stocker.

At step S414, if the type of the cassette transportation preparation instruction is related to the transportation of the semiconductor wafer cassette from the first stocker to the first EQ, the semiconductor wafer cassette is transported from the first stocker to the first EQ.

Referring to FIGS. 5 to 16, there are shown flowcharts showing a procedure of transporting a semiconductor wafer cassette from the first EQ to the second EQ shown in FIG. 4.

Figure 5:
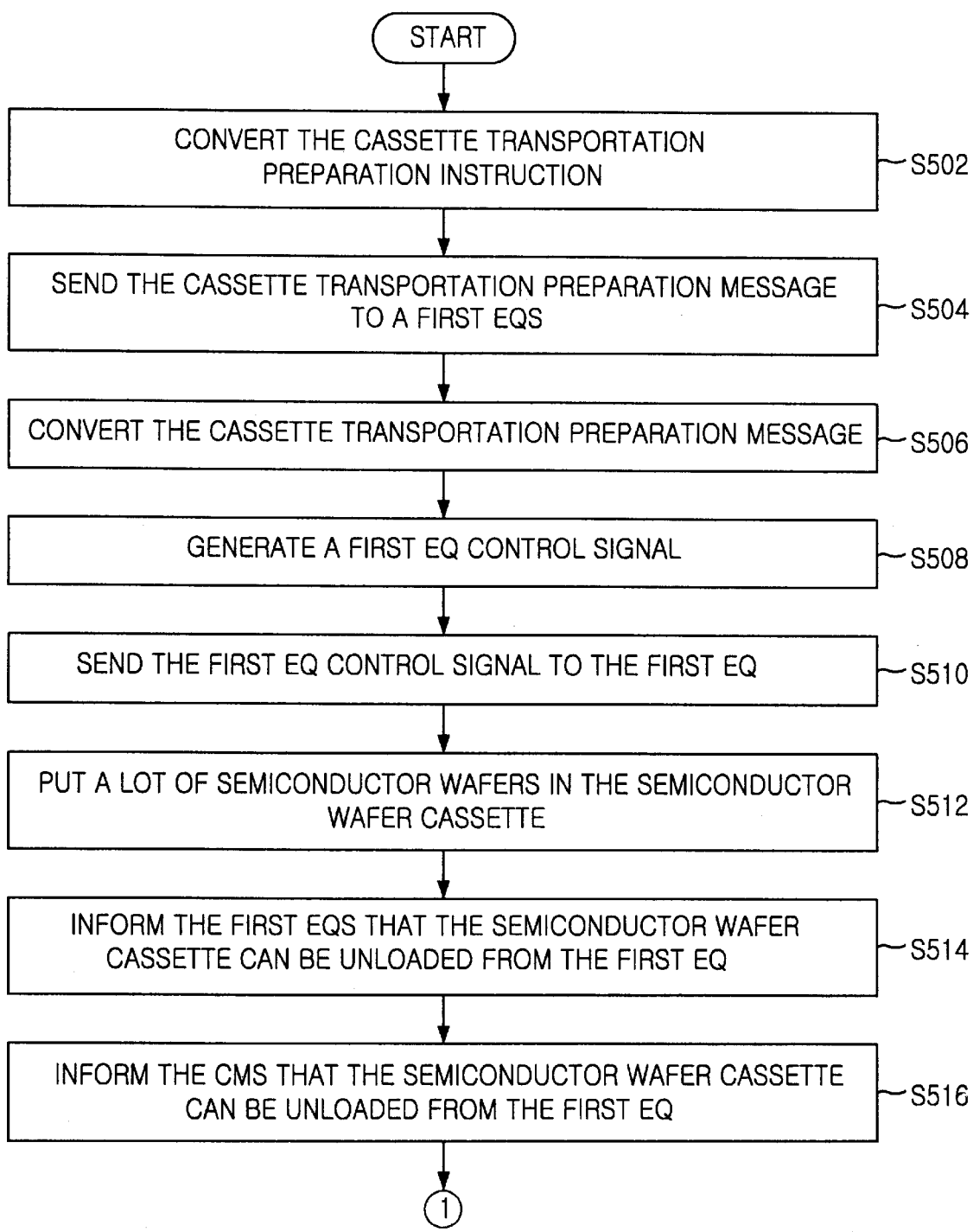
FIGS. 5 to 16 are flowcharts showing a procedure of transporting a semiconductor wafer cassette from an EQ to another EQ shown in FIG. 4.

Referring to FIG. 5, at step S502, the CMS converts the cassette transportation preparation instruction to a cassette transportation preparation message.

At step S504, the CMS sends the cassette transportation preparation message through the Ethernet™ to a first EQS coupled to the first EQ.

At step S506, the first EQS converts the cassette transportation preparation message to the cassette transportation preparation instruction.

At step S508, the first EQS generates a first EQ control signal corresponding to the cassette transportation preparation instruction.

At step S510, the first EQS sends the first EQ control signal to the first EQ, which has sent the cassette transportation request to the CMS.

At step S512, the first EQ puts a lot of semiconductor wafers in the semiconductor wafer cassette in response to the first EQ control signal. A glossary of the lot is defined as a predetermined number of semiconductor wafers processed in the first EQ.

At step S514, the first EQ informs the first EQS that the semiconductor wafer cassette can be unloaded from the first EQ.

Figure 6:
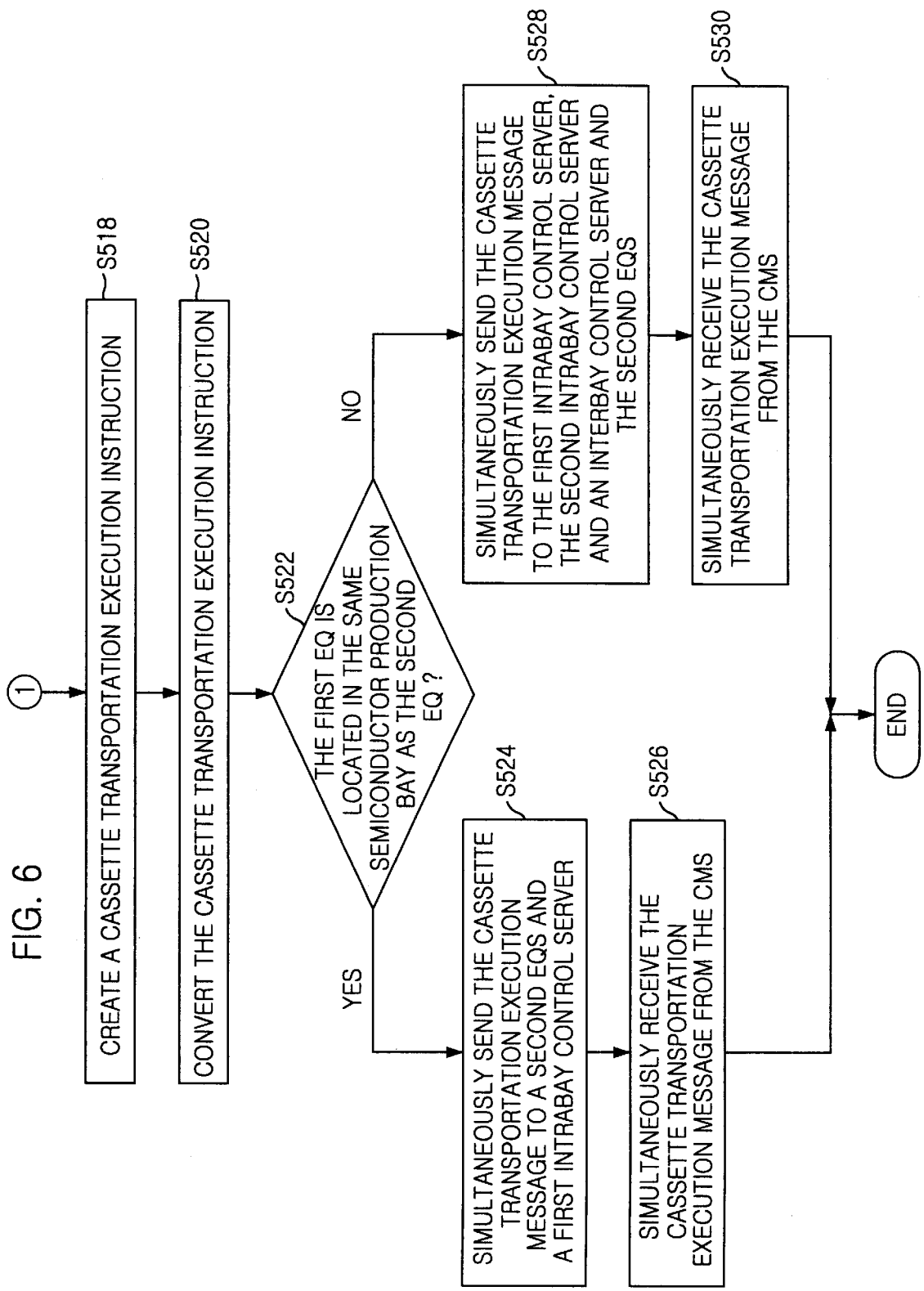

Referring to FIG. 6, at step S516, the first EQS informs the CMS that the semiconductor wafer cassette can be unloaded from the first EQ.

At step S518, the CMS creates a cassette transportation execution instruction.

At step S520, the CMS converts the cassette transportation execution instruction to a cassette transportation execution message.

At step 1522, it is determined whether the first EQ is located in the same semiconductor production bay as the second EQ.

At step S524, if the first EQ is located in the same semiconductor production bay as the second EQ, the OMS simultaneously sends the cassette transportation execution message to a second EQS coupled to the second EQ and a first intrabay control server contained in an automatic cassette handling portion.

At step S526, the second EQS and the first intrabay control server simultaneously receives the cassette transportation execution message from the CMS.

At step S528, if the first EQ is not located in the same semiconductor production bay as the second EQ, the CMS simultaneously sends the cassette transportation execution message to the first intrabay control server, the second intrabay control server and an interbay control server contained in the automatic cassette handling portion and the second EQS coupled to the second EQ.

At step S530, the first intrabay control server, the second intrabay control server, the interbay control server and the second EQS simultaneously receives the cassette transportation execution message from the CMS.

Figure 7:
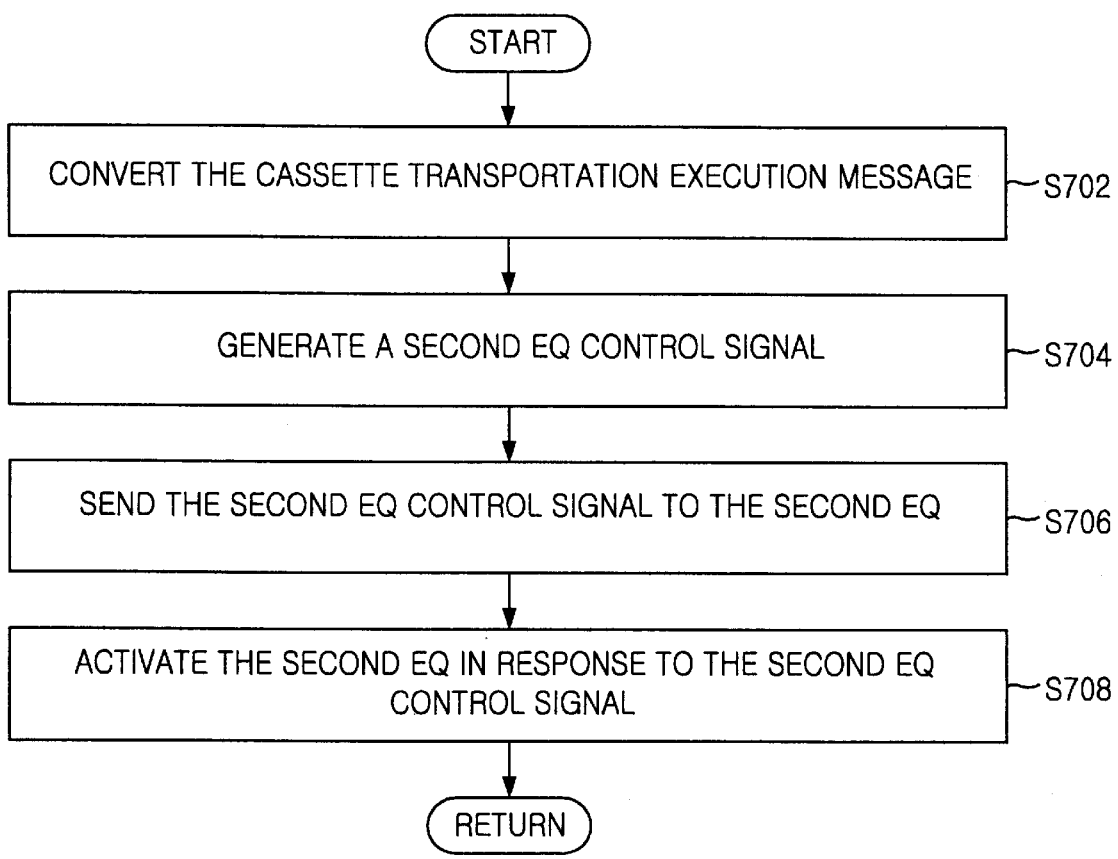

Referring to FIG. 7, there is shown a flowchart illustrating a procedure after the second EQS receives the cassette transportation execution message from the CMS at step S526 shown in FIG. 6.

At step S702, the second EQS converts the cassette transportation execution message to the cassette transportation execution instruction.

At step S704, the second EQS generates a second EQ control signal corresponding to the cassette transportation execution instruction.

At step S706, the second EQS sends the second EQ control signal to the second EQ.

At step S708, the second EQ is activated in response to the second EQ control signal.

Figure 8:
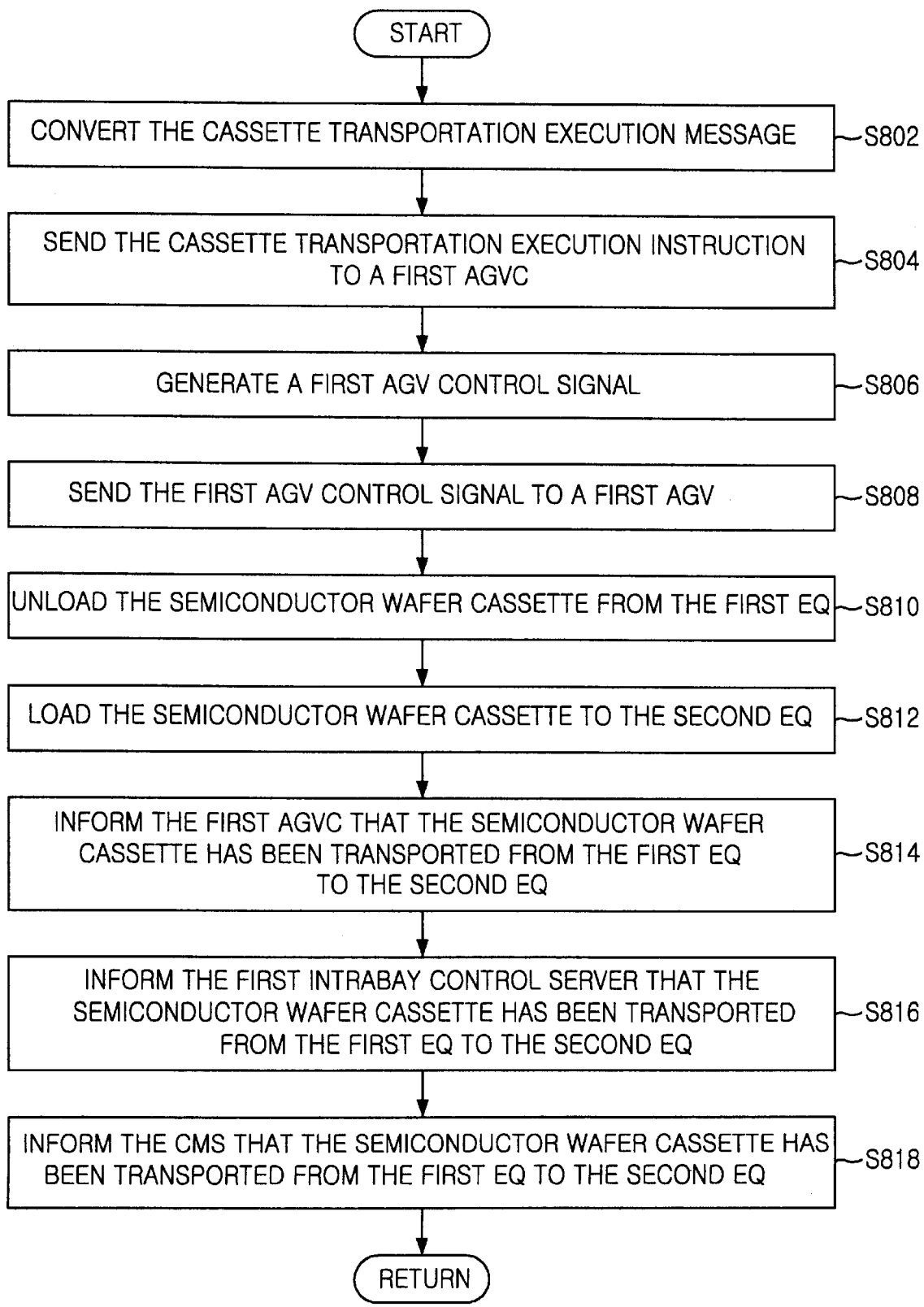

Referring to FIG. 8, there is shown a flowchart illustrating a procedure after the first intrabay control server receives the cassette transportation execution message from the CMS at step S526 shown in FIG. 6.

At step S802, the first intrabay control server converts the cassette transportation execution message to the cassette transportation execution instruction.

At step S804, the first intrabay control server sends the cassette transportation execution instruction through a first AGV control server to a first AGVC.

At step S806, the first AGVC generates a first AGV control signal corresponding to the cassette transportation execution instruction.

At step S808, the first AGVC sends the first AGV control signal to a first AGV.

At step S810, the first AGV unloads the semiconductor wafer cassette from the first EQ in response to the first AGV control signal.

At step S812, the first AGV loads the semiconductor wafer cassette to the second EQ.

At step S814, the first AGV informs the first AGVC that the semiconductor wafer cassette has been transported from the first EQ to the second EQ.

At step S816, the first AGVC informs the first intrabay control server that the semiconductor wafer cassette has been transported from the first EQ to the second EQ.

At step S818, the first intrabay control server informs the CMS that the semiconductor wafer cassette has been transported from the first EQ to the second EQ.

Figure 9:
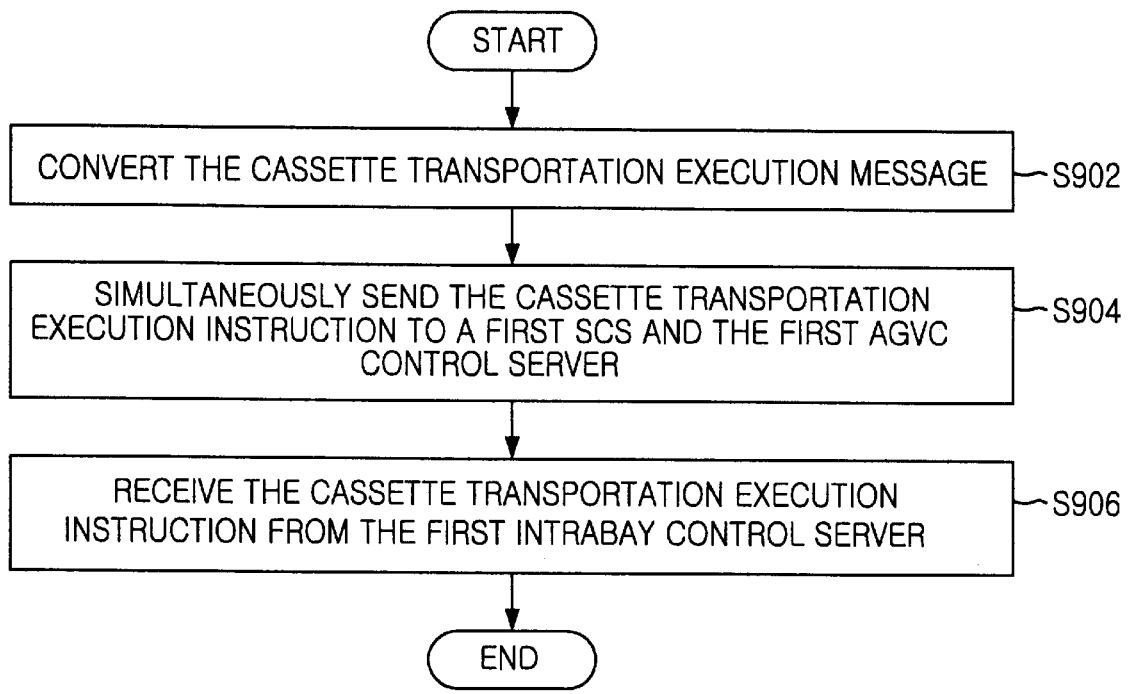
Figure 11:
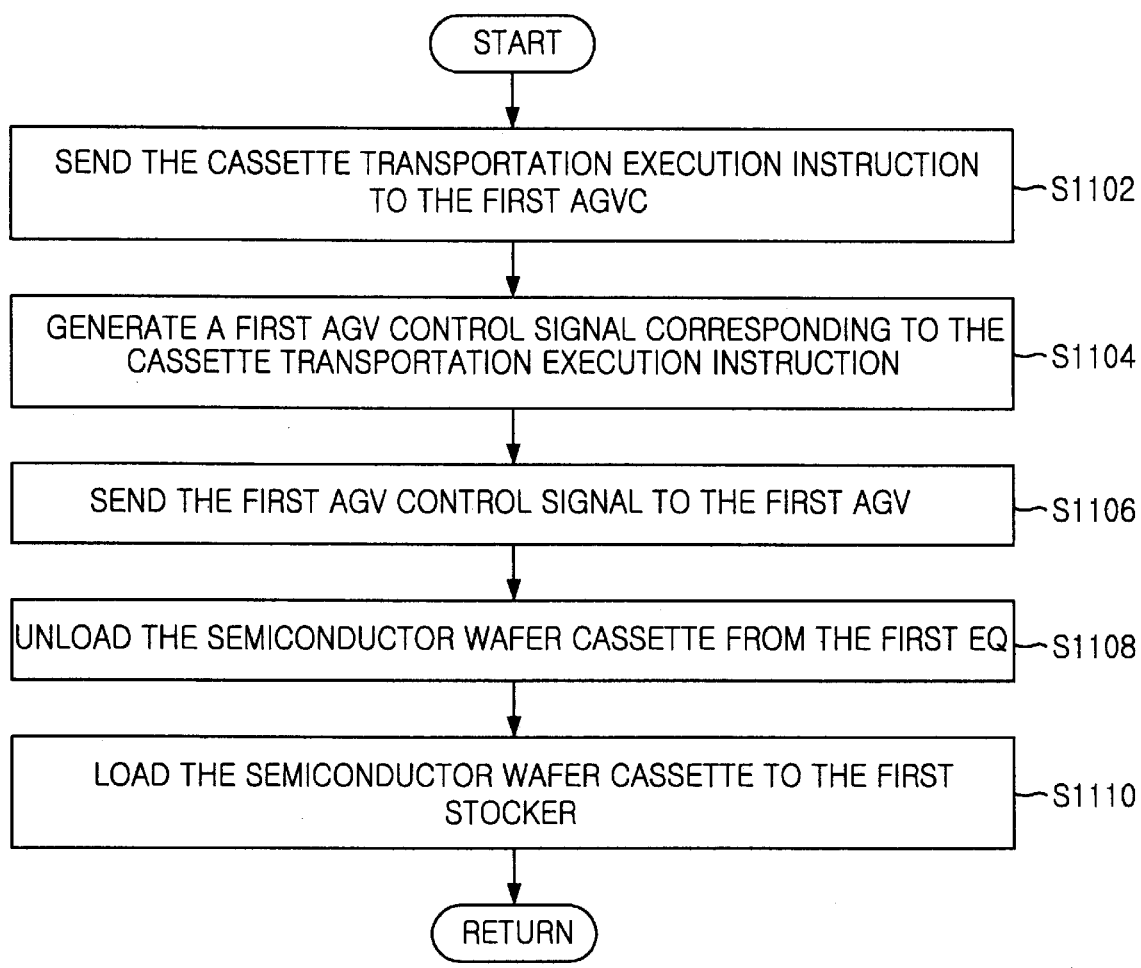

Referring to FIGS. 9 and 11, there are shown flowcharts illustrating a procedure after the first intrabay control server receives the cassette transportation execution message from the CMS at step S530 shown in FIG. 6.

Referring to FIG. 9, at step S902, the first intrabay control server converts the cassette transportation execution message to the cassette transportation execution instruction.

At step S904, the first intrabay control server simultaneously sends the cassette transportation execution instruction to a first SCS and the first AGVC control server.

At step S906, the first SCS and the first AGVC control server simultaneously receive the cassette transportation execution instruction from the first intrabay control server.

Figure 10:
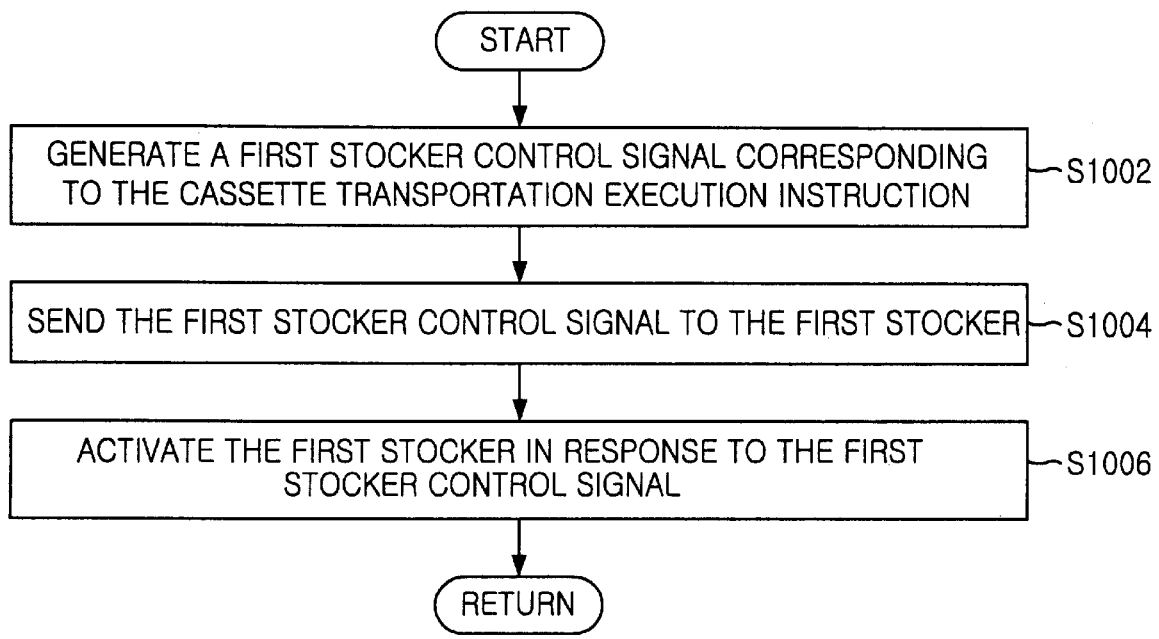

Referring to FIG. 10, there is shown a flowchart illustrating a procedure after the first SCS receives the cassette transportation execution instruction from the first intrabay control server at step S906 shown in FIG. 9.

At step S1002, the first SCS generates a first stocker control signal corresponding to the cassette transportation execution instruction.

At step S1004, the first SCS sends the first stocker control signal to the first stocker.

At step S1006, the first stocker is activated in response to the first stocker control signal.

Referring to FIG. 11, there is shown a flowchart illustrating a procedure after the first AGV control server receives the cassette transportation execution instruction from the first intrabay control server at step S906 shown in FIG. 9.

At step S1102, the first AGV control server sends the cassette transportation execution instruction to the first AGVC.

At step S1104, the first AGVC generates a first AGV control signal corresponding to the cassette transportation execution instruction.

At step S1106, the first AGVC sends the first AGV control signal to the first AGV.

At step S1108, the first AGV unloads the semiconductor wafer cassette from the first EQ.

At step S1110, the first AGV loads the semiconductor wafer cassette to the first stocker.

Figure 12:
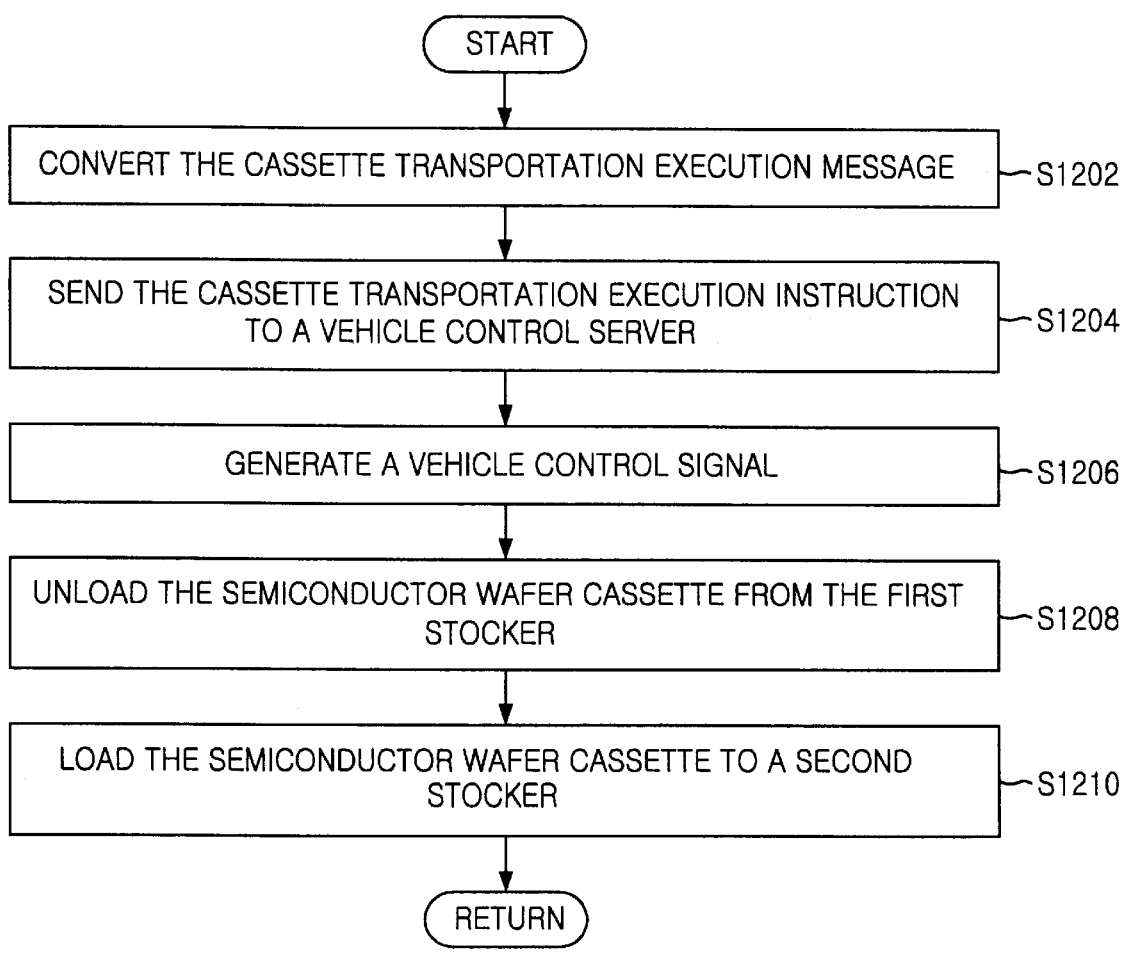

Referring to FIG. 12, there is shown a flowchart illustrating a procedure after the interbay control server receives the cassette transportation execution message from the CMS at step S530 shown in FIG. 6.

At step S1202, the interbay control server converts the cassette transportation execution message to the cassette transportation execution instruction.

At step S1204, the interbay control server sends the cassette transportation execution instruction to a vehicle control server.

At step S1206, the vehicle control server generates a vehicle control signal.

At step S1208, a vehicle unloads the semiconductor wafer cassette from the first stocker.

At step S1210, the vehicle loads the semiconductor wafer cassette to a second stocker.

Figure 13:
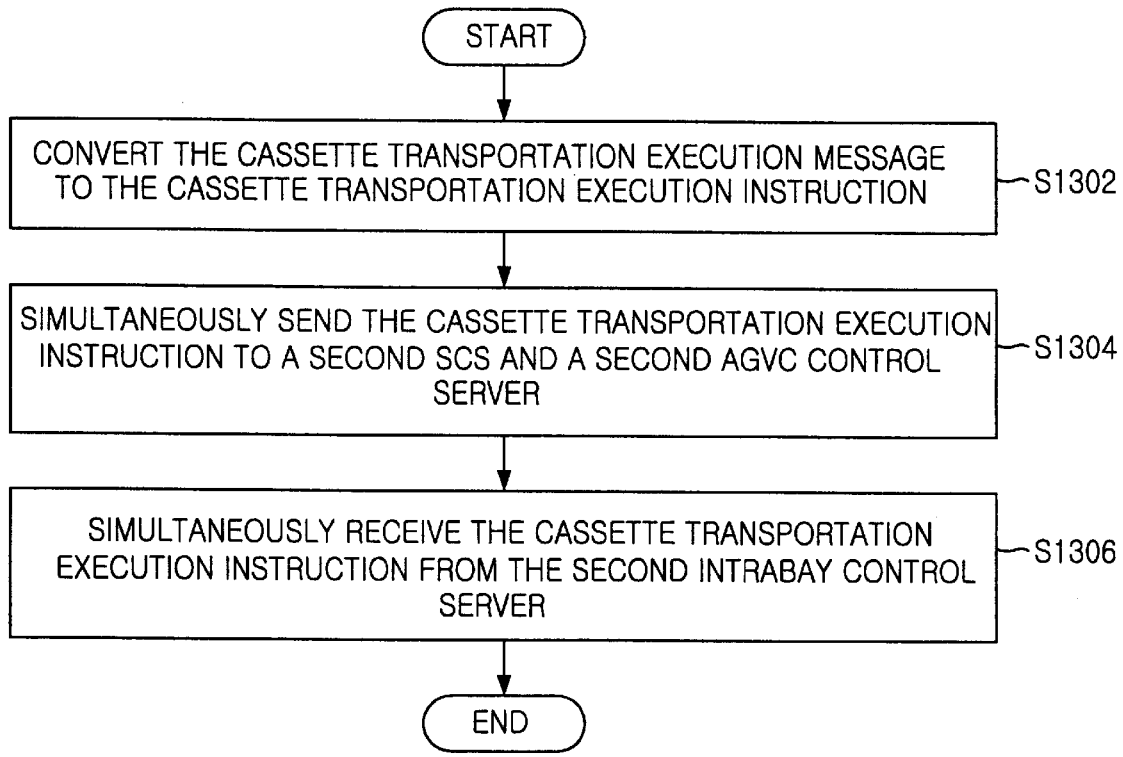

Referring to FIGS. 13 and 1S, there are shown flowcharts illustrating a procedure after the second intrabay control server receives the cassette transportation execution message from the CMS at step S530 shown in FIG. 6.

Referring to FIG. 13, at step S1302, the second intrabay control server converts the cassette transportation execution message to the cassette transportation execution instruction.

At step S1304, the second intrabay control server simultaneously sends the cassette transportation execution instruction to a second SCS and a second AGVC control server.

At step S1306, the second SCS and the second AGVC control server simultaneously receive the cassette transportation execution instruction from the second intrabay control server.

Figure 14:
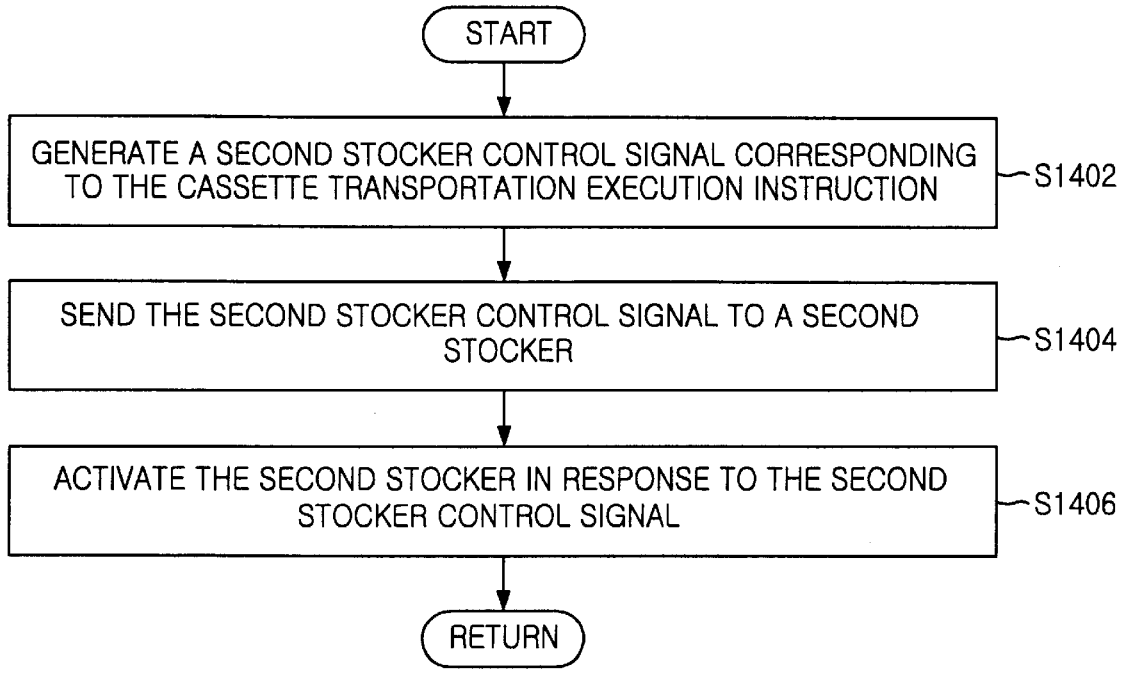

Referring to FIG. 14, there is shown a flowchart illustrating a procedure after the second SCS receives the cassette transportation execution instruction from the second intrabay control server at step S1306 shown in FIG. 13.

At step S1402, the second SCS generates a second stocker control signal corresponding to the cassette transportation execution instruction.

At step S1404, the second SCS sends the second stocker control signal to a second stocker.

At step S1406, the second stocker is activated in response to the second stocker control signal.

Figure 15:
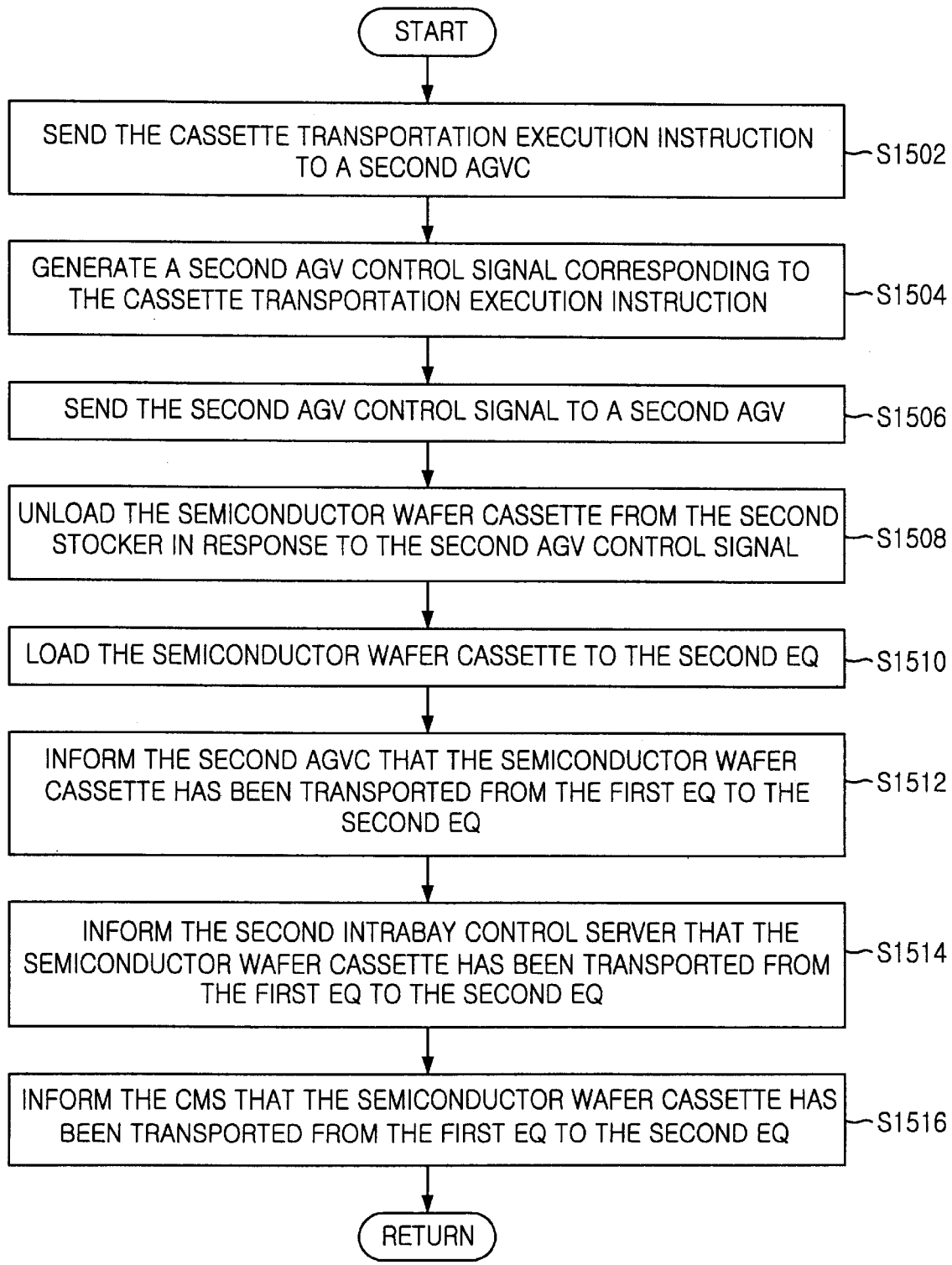

Referring to FIG. 15, there is shown a flowchart illustrating a procedure after the second AGVC control server receives the cassette transportation execution instruction from the second intrabay control server at step S1306 shown in FIG. 13.

At step S1502, the second AGVC control server sends the cassette transportation execution instruction to a second AGVC.

At step S1504, the second AGVC generates a second AGV control signal corresponding to the cassette transportation execution instruction.

At step S1506, the second AGVC sends the second AGV control signal to a second AGV.

At step S1508, the second AGV unloads the semiconductor wafer cassette from the second stocker in response to the second AGV control signal.

At step S1510, the second AGV loads the semiconductor wafer cassette to the second EQ as the destination of the semiconductor wafer cassette.

At step S1512, the second AGV informs the second AGVC that the semiconductor wafer cassette has been transported from the first EQ to the second EQ.

At step S1514, the second AGVC informs the second intrabay control server that the semiconductor wafer cassette has been transported from the first EQ to the second EQ.

At step S1516, the second intrabay control server informs the CMS that the semiconductor wafer cassette has been transported from the first EQ to the second EQ.

Figure 16:
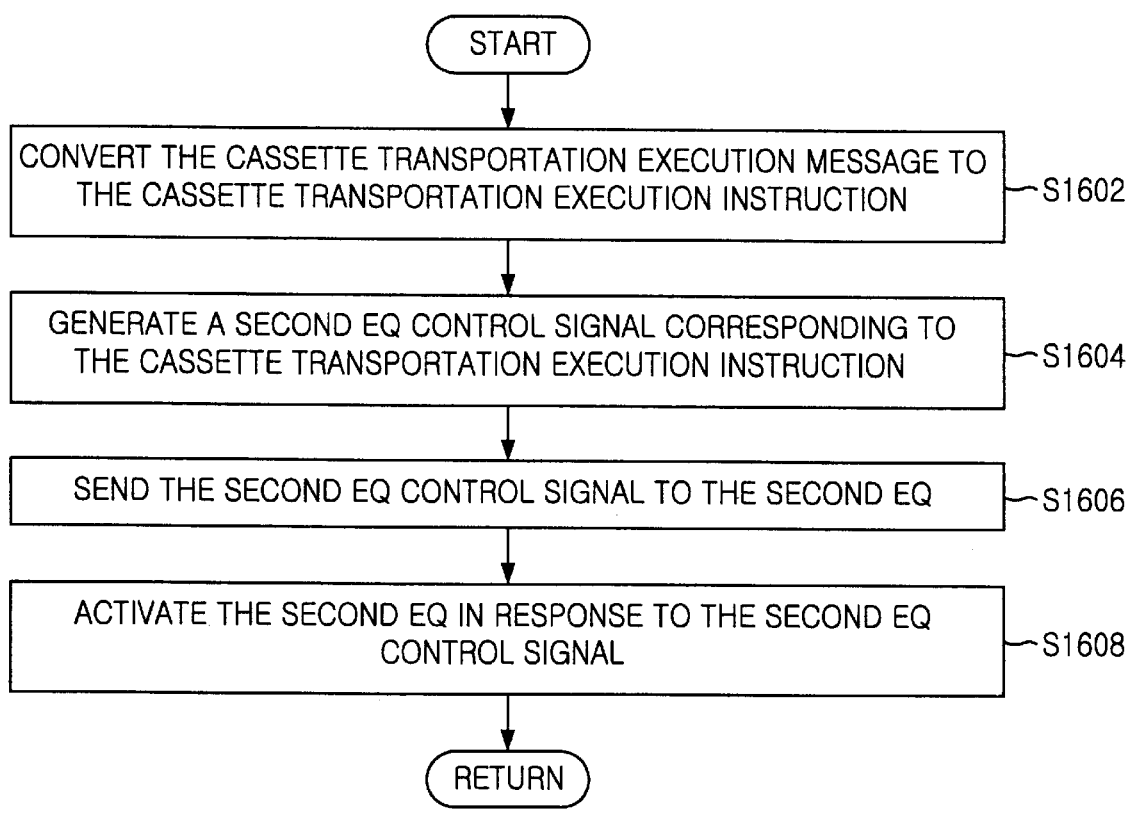

Referring to FIG. 16, there are shown a flowchart illustrating a procedure after the second EQS receives the cassette transportation execution message from the CMS at step S530 shown in FIG. 6.

At step S1602, the second EQS converts the cassette transportation execution message to the cassette transportation execution instruction.

At step S1604, the second EQS generates a second EQ control signal corresponding to the cassette transportation execution instruction.

At step S1606, the second EQS sends the second EQ control signal to the second EQ.

At step S1608, the second EQ is activated in response to the second EQ control signal.

Referring to FIGS. 17 to 20, there are shown flowcharts showing a procedure of transporting a semiconductor wafer cassette from the first EQ to the first stocker shown in FIG. 4.

Figure 17:
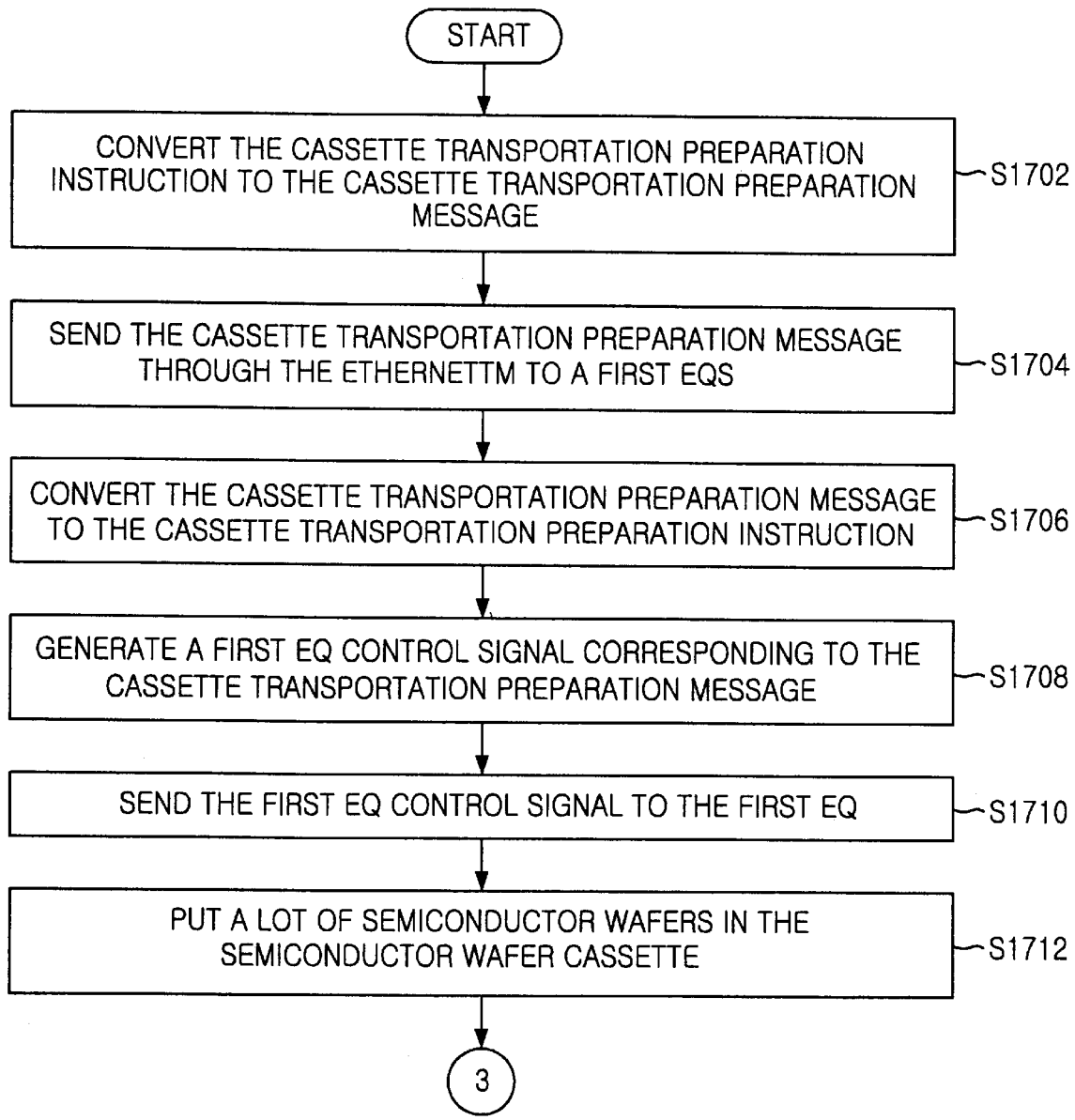
FIGS. 17 to 20 are flowcharts showing a procedure of transporting a semiconductor wafer cassette from an EQ to a stocker shown in FIG. 4.

Referring to FIG. 17, at step S1702, the CMS converts the cassette transportation preparation instruction to the cassette transportation preparation message.

At step S1704, the CMS sends the cassette transportation preparation message through the Ethernet™ to a first EQS coupled to the first EQ.

At step S1706, the first EQS converts the cassette transportation preparation message to the cassette transportation preparation instruction.

At step S1708, the first EQS generates a first EQ control signal corresponding to the cassette transportation preparation message.

At step S1710, the first EQS sends the first EQ control signal to the first EQ, which has sent the cassette transportation request to the CMS.

At step S1712, the first EQ puts a lot of semiconductor wafers in the semiconductor wafer cassette in response to the first EQ control signal.

Figure 18:
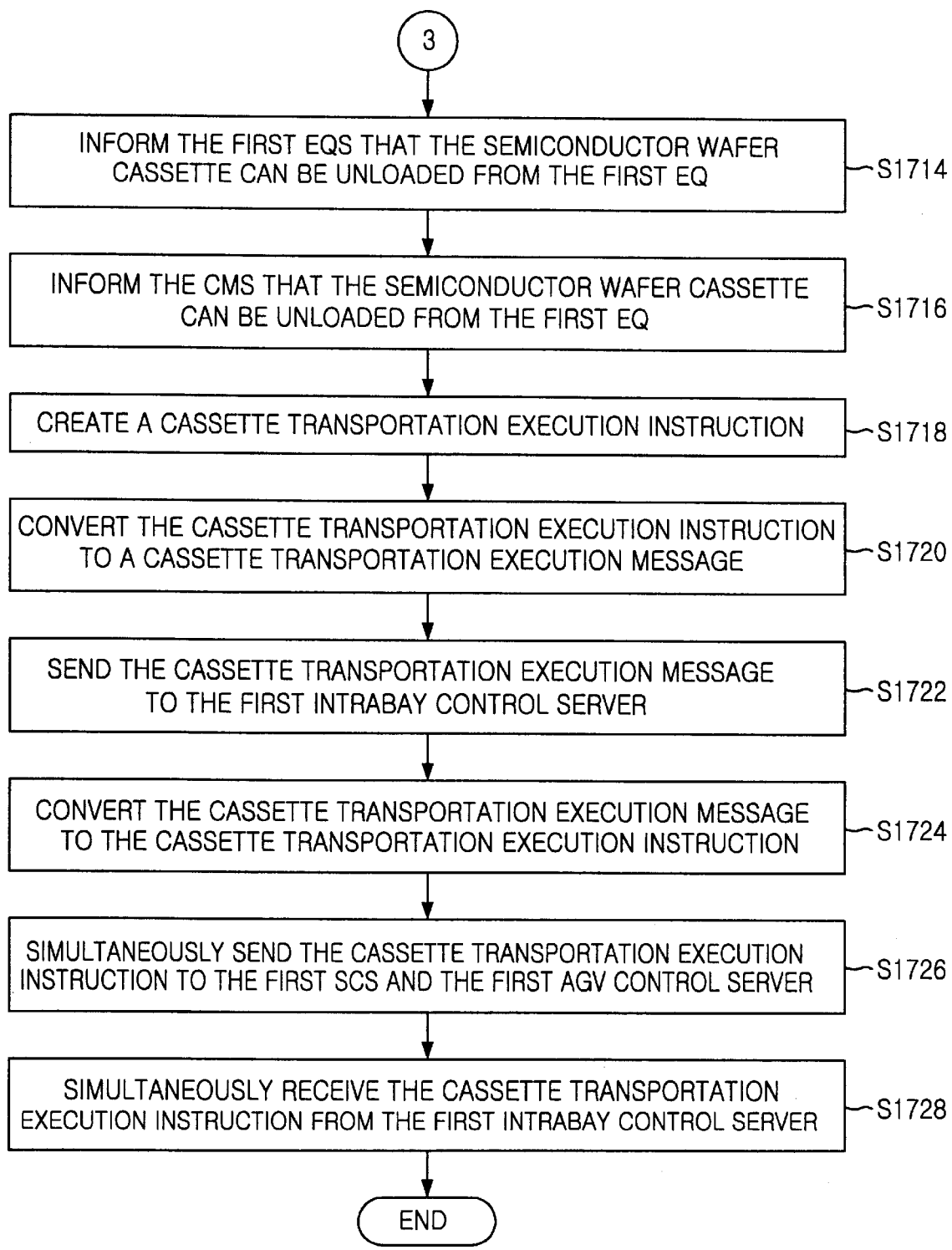

Referring to FIG. 18, at step S1714 the first EQ informs the first EQS that the semiconductor wafer cassette can be unloaded from the first EQ.

At step S1716, the first EQS informs the CMS that the semiconductor wafer cassette can be unloaded from the first EQ.

At step S1718, the CMS creates a cassette transportation execution instruction.

At step S1720, the CMS converts the cassette transportation execution instruction to a cassette transportation execution message.

At step S1722, the CMS sends the cassette transportation execution message to the first intrabay control server.

At step S1724, the first intrabay control server converts the cassette transportation execution message to the cassette transportation execution instruction.

At step S1726, the first intrabay control server simultaneously sends the cassette transportation execution instruction to the first SCS and the first AGV control server.

At step S1728, the first SCS and the first AGV control server simultaneously receives the cassette transportation execution instruction from the first intrabay control server.

Figure 19:
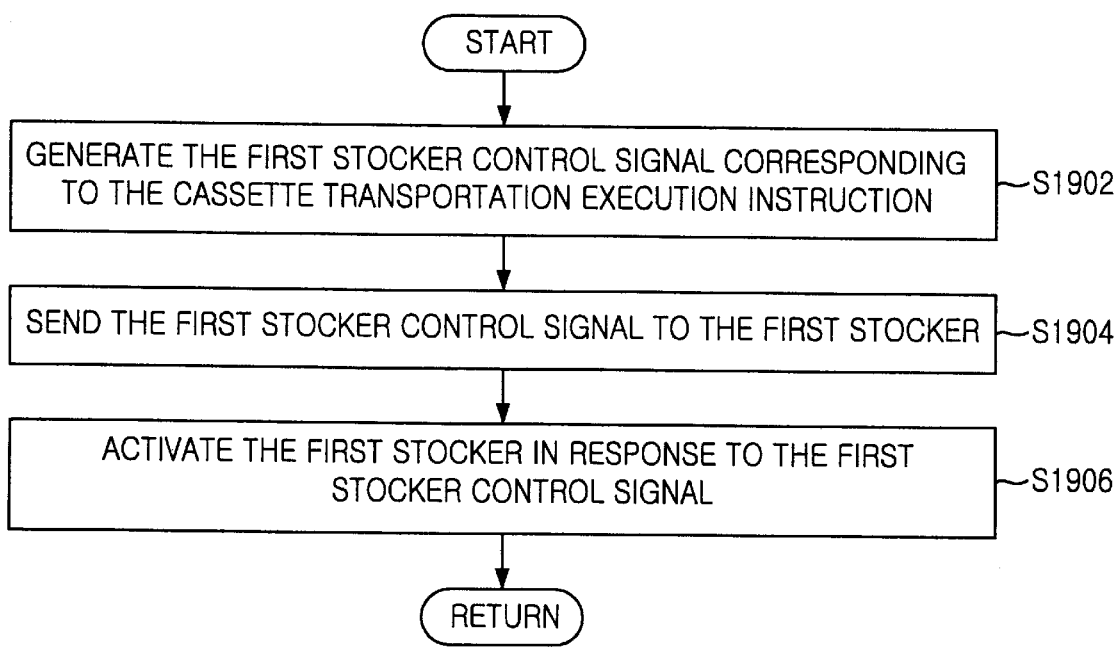

Referring to FIG. 19, there are shown a flowchart illustrating a procedure after the first SCS receives the cassette transportation execution instruction from the first intrabay control server at step S1728 shown in FIG. 18.

At step S1902, the first SCS generates the first stocker control signal corresponding to the cassette transportation execution instruction.

At step S1904, the first SCS sends the first stocker control signal to the first stocker.

At step S1906, the first stocker is activated in response to the first stocker control signal.

Figure 20:
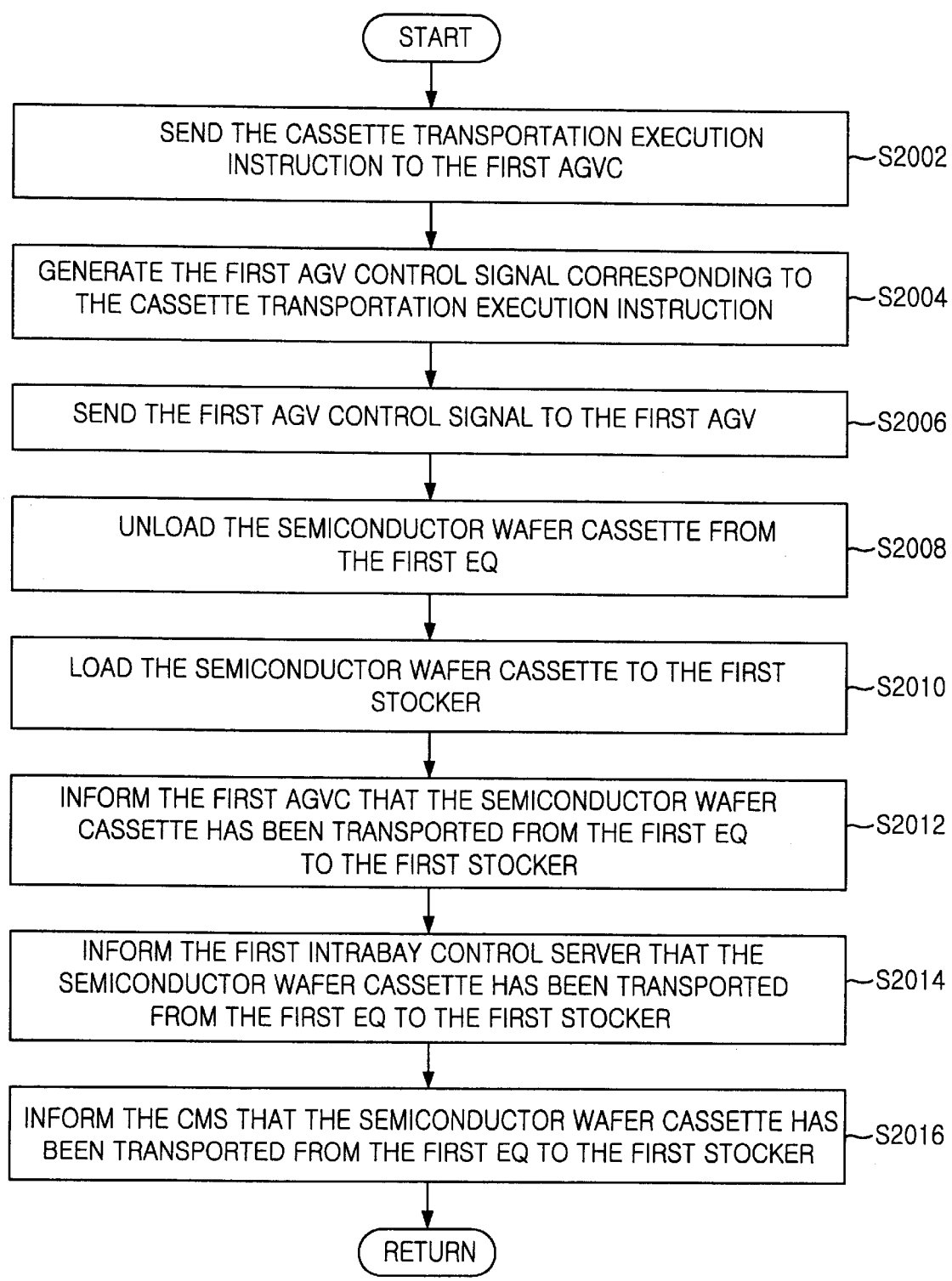

Referring to FIG. 20, there is shown a flowchart illustrating a procedure after the first AGV control server receives the cassette transportation execution instruction from the first intrabay control server at step S1728 shown in FIG. 18.

At step S2002, the first AGV control server sends the cassette transportation execution instruction to the first AGVC.

At step S2004, the first AGVC generates the first AGV control signal corresponding to the cassette transportation execution instruction.

At step S2006, the first AGVC sends the first AGV control signal to the first AGV.

At step S2008, the first AGV unloads the semiconductor wafer cassette from the first EQ.

At step S2010, the first AGV loads the semiconductor wafer cassette to the first stocker.

At step S2012, the first AGV informs the first AGVC that the semiconductor wafer cassette has been transported from the first EQ to the first stocker.

At step S2014, the first AGVC informs the first intrabay control server that the semiconductor wafer cassette has been transported from the first EQ to the first stocker.

At step S2016, the first intrabay control server informs the CMS that the semiconductor wafer cassette has been transported from the first EQ to the first stocker.

Referring to FIGS. 21 to 26, there are shown flowcharts showing a procedure of transporting a semiconductor wafer cassette from the first stocker to the first EQ shown in FIG. 4.

Figure 21:
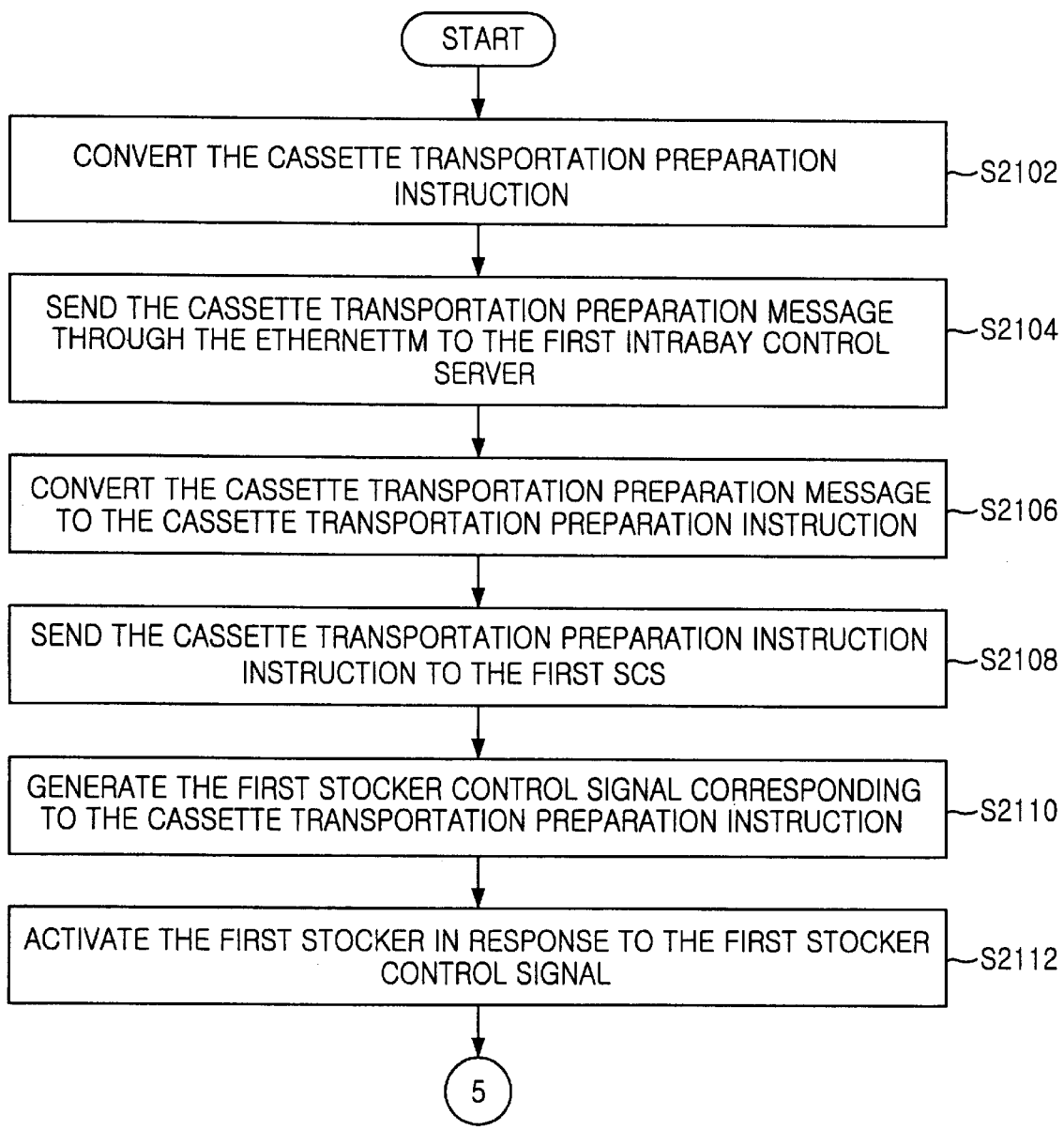
FIGS. 21 and 26 are flowcharts showing a procedure of transporting a semiconductor wafer cassette from a stocker to an EQ shown in FIG. 4.

Referring to FIG. 21, at step S2102, the CMS converts the cassette transportation preparation instruction to the cassette transportation preparation message.

At step S2104, the CMS sends the cassette transportation preparation message through the Ethernet™ to the first intrabay control server.

At step S2106, the first intrabay control server converts the cassette transportation preparation message to the cassette transportation preparation instruction.

At step S2108, the first intrabay control server sends the cassette transportation preparation instruction to the first SCS.

At step S2110, the first SCS generates the first stocker control signal corresponding to the cassette transportation preparation instruction.

At step S2112, the first stocker is activated in response to the first stocker control signal.

Figure 22:
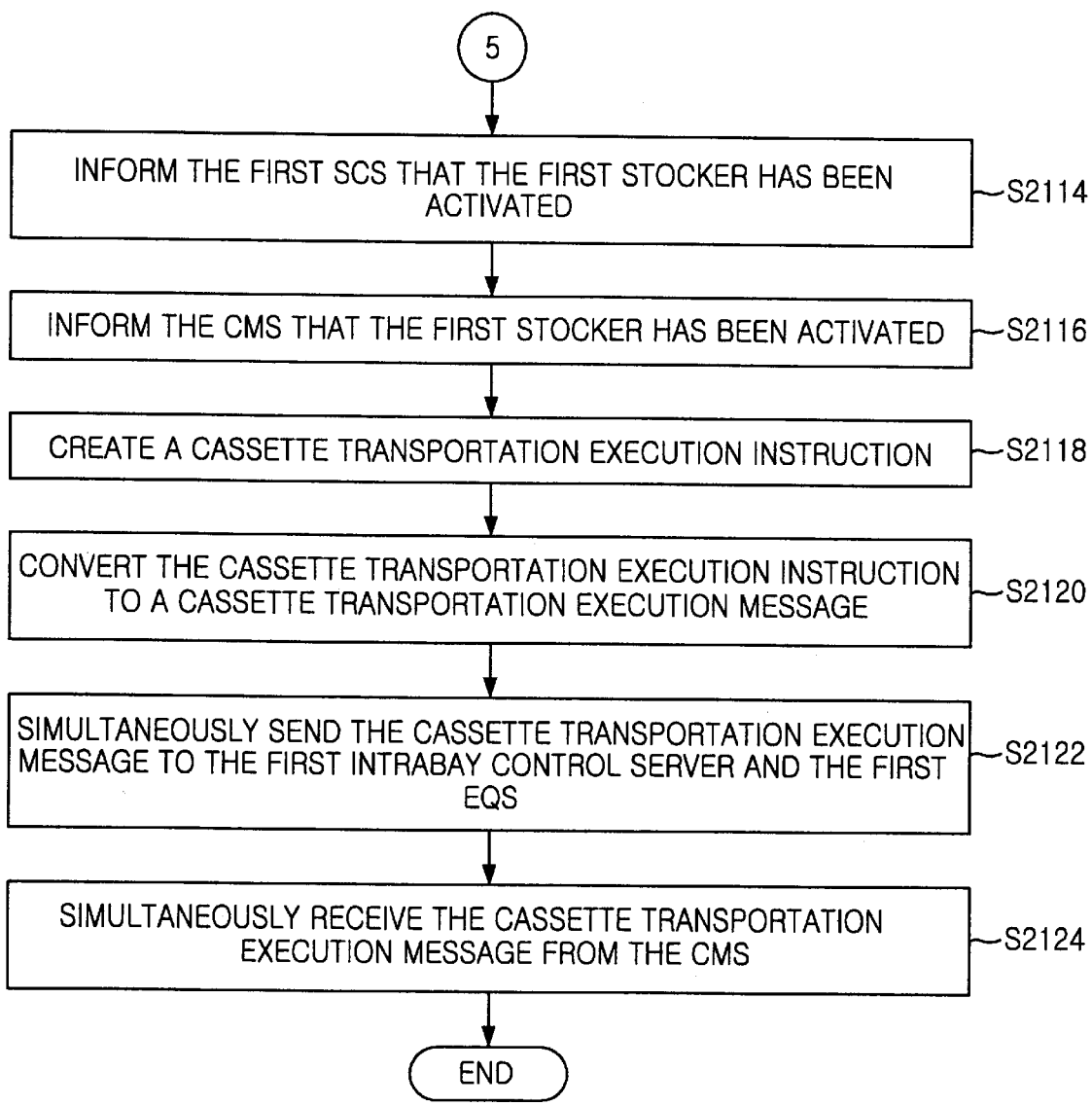

Referring to FIG. 22, at step S2114, the first stocker informs the first SCS that the first stocker has been activated.

At step S2116, the first SCS informs the CMS that the first stocker has been activated.

At step S2118, the CMS creates a cassette transportation execution instruction.

At step S2120, the CMS converts the cassette transportation execution instruction to a cassette transportation execution message.

At step S2122, the CMS simultaneously sends the cassette transportation execution message to the first intrabay control server and the first EQS.

At step S2124, the first intrabay control server and the first EQS simultaneously receives the cassette transportation execution message from the CMS.

Figure 23:
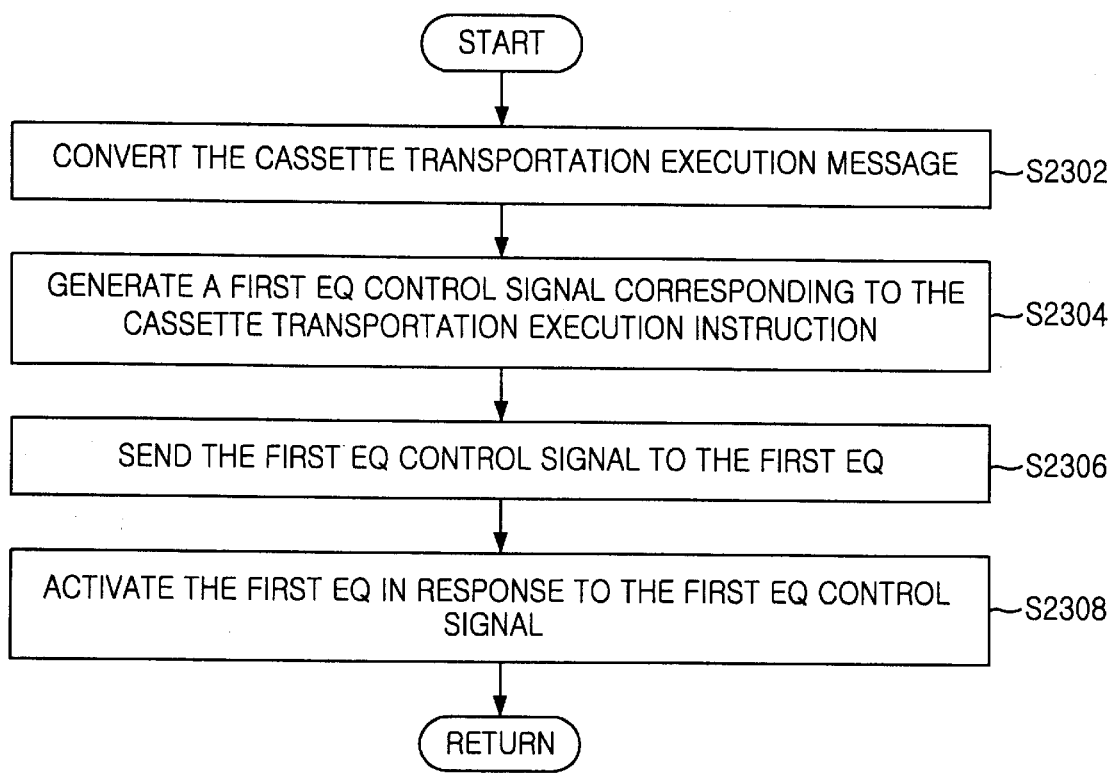

Referring to FIG. 23, there are shown a flowchart illustrating a procedure after the first EQS receives the cassette transportation execution instruction from the CMS at step S2134 shown in FIG. 22.

At step S2302, the first EQS converts the cassette transportation execution message to the cassette transportation execution instruction.

At step S2304, the first EQS generates a first EQ control signal corresponding to the cassette transportation execution instruction.

At step S2306, the first EQS sends the first EQ control signal to the first EQ.

At step S2308, the first EQ is activated in response to the first EQ control signal.

Figure 24:
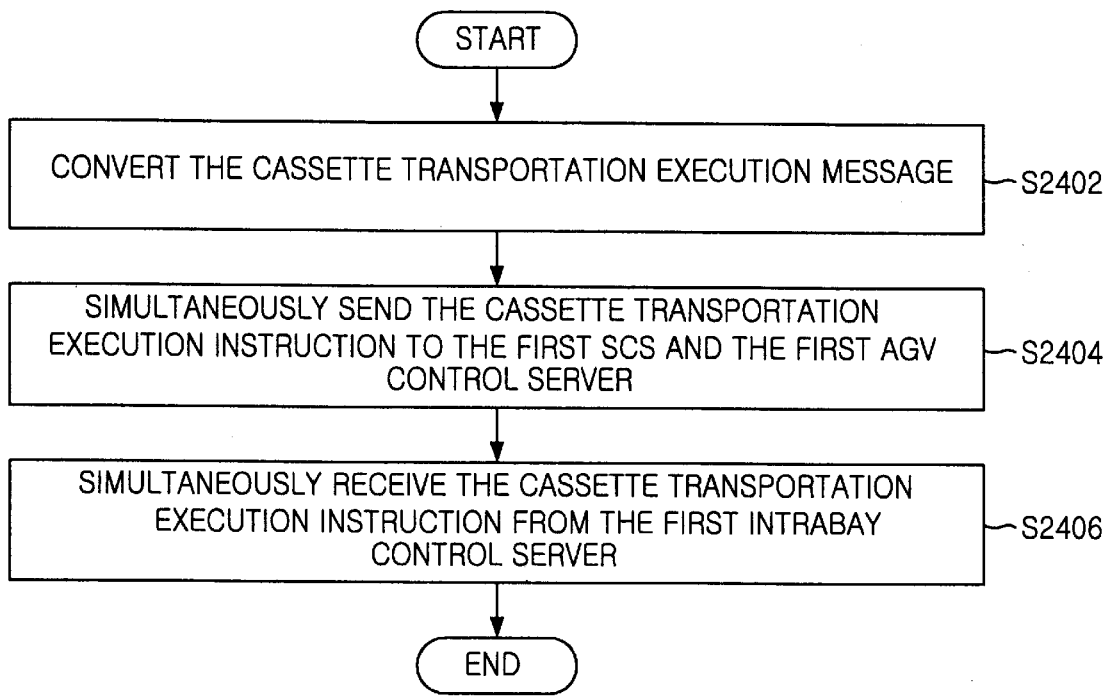

Referring to FIG. 24, there are shown a flowchart illustrating a procedure after the first intrabay control server receives the cassette transportation execution instruction from the CMS at step S2134 shown in FIG. 22.

At step S2402, the first intrabay control server converts the cassette transportation execution message to the cassette transportation execution instruction.

At step S2404, the first intrabay control server simultaneously sends the cassette transportation execution instruction to the first SCS and the first AGV control server.

At step S2406, the first SCS and the first AGV control server simultaneously receives the cassette transportation execution instruction from the first intrabay control server.

Figure 25:
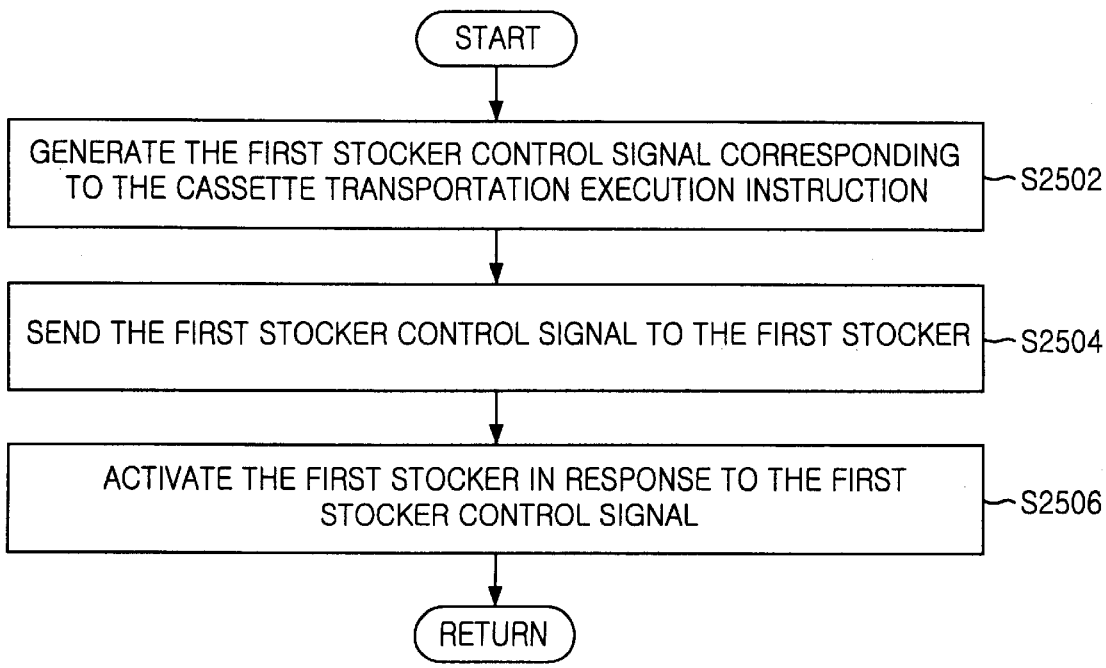

Referring to FIG. 25, there are shown a flowchart illustrating a procedure after the first SCS receives the cassette transportation execution instruction from the first intrabay control server at step S2406 shown in FIG. 24.

At step S2502, the first SCS generates the first stocker control signal corresponding to the cassette transportation execution instruction.

At step S2504, the first SCS sends the first stocker control signal to the first stocker.

At step S2506, the first stocker is activated in response to the first stocker control signal.

Figure 26:
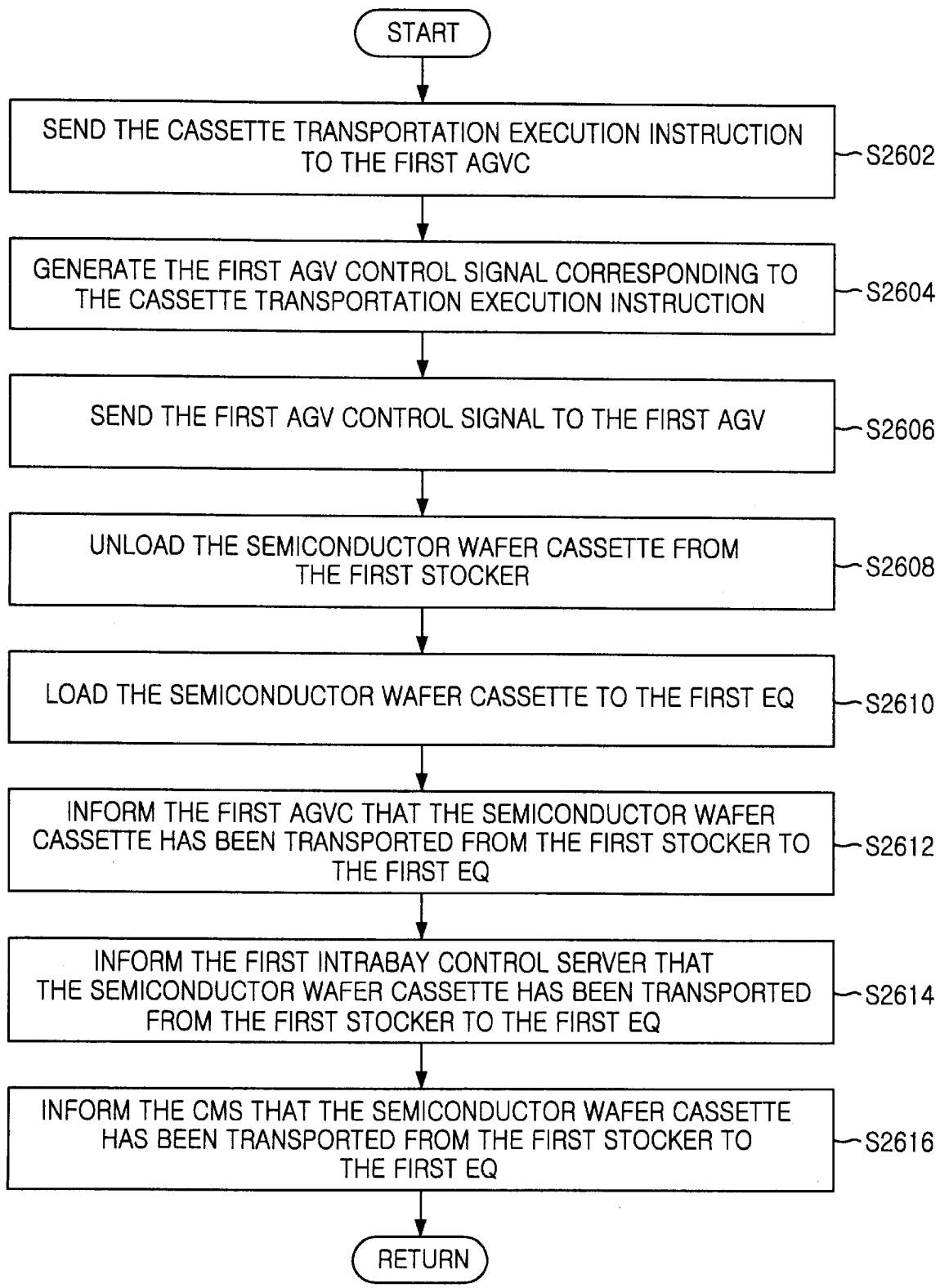

Referring to FIG. 26, there are shown a flowchart illustrating a procedure after the first AGV control server receives the cassette transportation execution instruction from the first intrabay control server at step S2406 shown in FIG. 24.

At step S2602, the first AGV control server sends the cassette transportation execution instruction to the first AGVC.

At step S2604, the first AGVC generates the first AGV control signal corresponding to the cassette transportation execution instruction.

At step S2606, the first AGVC sends the first AGV control signal to the first AGV.

At step S2608, the first AGV unloads the semiconductor wafer cassette from the first stocker.

At step S2610, the first AGV loads the semiconductor wafer cassette to the first EQ.

At step S2612, the first AGV informs the first AGVC that the semiconductor wafer cassette has been transported from the first stocker to the first EQ.

At step S2614, the first AGVC informs the first intrabay control server that the semiconductor wafer cassette has been transported from the first stocker to the first EQ.

At step S2616, the first intrabay control server informs the CMS that the semiconductor wafer cassette has been transported from the first stocker to the first EQ.

A computer-readable media such as an optical disk or a hard disk can store program instructions disposed on a computer to perform the method for transporting a semiconductor wafer cassette in accordance with the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A semiconductor factory automation (FA) system, comprising:

a common communication line;

a plurality of process means for processing a lot of semiconductor wafers to be contained in a semiconductor wafer cassette, wherein one of said process means sends a cassette transportation request when the one of said process means has processed the lot of semiconductor wafers;

an instruction generation means coupled to said common communication line for generating a transportation instruction in response to the cassette transportation request;

a transportation control means coupled to said common communication line for controlling a semiconductor wafer cassette transportation in response to the transportation instruction;

a plurality of transportation means for transporting the semiconductor wafer cassette, wherein said transportation means are controlled by said transportation control means; and a plurality of stocker means coupled to said transportation control means for loading the semiconductor wafer cassette, wherein said transportation control means simultaneously activates one of said transportation means and one of said stocker means by simultaneously sending the transportation instruction to the one of said transportation means and the one of said stocker means if the semiconductor wafer cassette is transported from the one of said process means to the one of said stocker means by the one of said transportation means;

said transportation control means further simultaneously activating the one of said transportation means and another process means by simultaneously sending the transportation instruction to the one of said transportation means and said another process means when the semiconductor wafer cassette is transported from the one of said process means to said another process means by the one of said transportation means.

2. The semiconductor FA system as recited in claim 1, wherein the one of said stocker means further sends the cassette transportation request to said transportation control means.

3. The semiconductor FA system as recited in claim 2, wherein said transportation control means further simultaneously activates the one of said transportation means and the one of said process means by simultaneously sending the transportation instruction to the one of said transportation means and the one of said process means if the semiconductor wafer cassette is transported from the one of said stocker means to the one of said process means by the one of said transportation means.

4. The semiconductor FA system as recited in claim 1, wherein said process means, said transportation means and said stocker means are positioned on semiconductor production bays.

5. The semiconductor FA system as recited claim 4, wherein the one of said process means and said another process means are positioned on a same semiconductor production bay as each other.

6. The semiconductor FA system as recited in claim 4, further comprising:
   a second transportation means for transporting the semiconductor wafer cassette between the semiconductor production bays.

7. The semiconductor FA system as recited in claim 6, wherein said transportation control means further simultaneously activates the one of said transportation means, another transportation means, another process means and said second transportation means by simultaneously sending the transportation instruction to the one of said transportation means, said another transportation means, said another process means and said second transportation means when the semiconductor wafer cassette is transported from the one of said process means to said another process means,
   wherein the one of said process means and said another process means are positioned on different semiconductor production bays relative to each other; and wherein the one of said process means and the one of said transportation means are positioned on a same semiconductor production bay as each other; and wherein said another process means and said another transportation means are positioned on a same semiconductor production bay as each other.

8. The semiconductor FA system as recited in claim 7, wherein said transportation control means includes:
   a plurality of stocker control means for generating a stocker control signal to control said stocker means in response to the transportation instruction;
   a plurality of third transportation means for generating first transportation control signal to control said transportation means in response to the transportation instruction; and
   a fourth transportation means for generating a second transportation control signal to control said second transportation means in response to the transportation instruction.

9. The semiconductor FA system as recited in claim 8, further comprising:
   an operator interface means for providing an operator interface screen.

10. The semiconductor FA system as recited in claim 9, wherein the operator interface screen includes:
   a first display portion for displaying information of said transportation means positioned on a semiconductor production bay;
   a second display portion for displaying information of the semiconductor production bay;
   a third display portion for displaying information of the semiconductor wafer cassette contained in said transportation means positioned on a semiconductor production bay.

11. The semiconductor FA system as recited in claim 10, wherein the information of said transportation means includes error information of said transportation means; and wherein said first display portion displays a color as the error information.

12. The semiconductor FA system as recited in claim 10, wherein the information of the semiconductor wafer cassette includes origination information of the semiconductor wafer cassette, destination information of the semiconductor wafer cassette, identification information of the semiconductor wafer cassette and current position information of the semiconductor wafer cassette.

13. The semiconductor FA system as recited in claim 9, wherein the operator interface screen includes:
   a first display portion for displaying current position information of said second transportation means;
   a second display portion for displaying information of the semiconductor production bay; and
   a third display portion for displaying information of the semiconductor wafer cassette contained in said second transportation means.

14. A method for transporting semiconductor wafers in a semiconductor factory automation system, comprising the steps of:
   processing a lot of semiconductor wafers to be contained in a semiconductor wafer cassette in a process equipment;
   sending a cassette transportation request from the process equipment to a cell management server when the process equipment has processed the lot of semiconductor wafers;
   generating a transportation instruction in response to the cassette transportation request; and
   simultaneously activating an automatic guide vehicle (AGV) used to transport the semiconductor wafer cassette and an equipment to which said semiconductor wafer cassette is transported, such simultaneous activation reducing a time necessary for semiconductor manufacture.

15. The method as recited in claim 14, further comprising the steps of:
   when the semiconductor wafer cassette is transported from the process equipment to a stocker by the AGV, simultaneously activating the AGV and the stocker by simultaneously sending the transportation instruction to the AGV and the stocker; and
   sending the cassette transportation request from the stocker to the cell management server.

16. The method as recited in claim 15, further comprising the step of:
   when the semiconductor wafer cassette is transported from the stocker to the process equipment by the AGV, simultaneously activating the AGV and the process equipment by simultaneously sending the transportation instruction to the AGV and the process equipment.

17. The method as recited in claim 16, further comprising the step of:

when the semiconductor wafer cassette is transported from the process equipment to another process equipment by the AGV, simultaneously activating the AGV and said another process equipment by simultaneously sending the transportation instruction to the AGV and said another process equipment.

18. The method as recited in claim 17, further comprising the step of:

transporting the semiconductor wafer cassette between semiconductor production bays by employing a vehicle.

19. The method as recited in claim 18, further comprising the step of:

in response to the semiconductor wafer cassette being transported from the process equipment to another process equipment, simultaneously activating the AGV, another AGV, said another process equipment and the vehicle by simultaneously sending the transportation instruction to the AGV, to said another AGV, to said another process equipment and to said vehicle, wherein the process equipment and said another process equipment are positioned on different semiconductor production bays relative to each other; and wherein the process equipment and the AGV are positioned on a same semiconductor production as each other; and wherein said another process equipment and said another AGV are positioned on a same semiconductor bay as each other.

20. The method as recited in claim 14, further comprising the step of:

providing an operator interface screen.

21. The method as recited in claim 20, wherein the operator interface screen includes:

a first display portion for displaying information of the AGV positioned on a semiconductor production bay;

a second display portion for displaying information of the semiconductor production bay; and a third display portion for displaying information of the semiconductor wafer cassette contained in the AGV positioned on a semiconductor production bay.

22. The method as recited in claim 21, wherein the information of the AGV includes error information of the AGV; and wherein said first display portion displays a color as the error information.

23. The method as recited in claim 22, wherein the information of the semiconductor wafer cassette includes origination information of the semiconductor wafer cassette, destination information of the semiconductor wafer cassette, identification information of the semiconductor wafer cassette and current position information of the semiconductor wafer cassette.

24. The method as recited in claim 20, wherein the operator interface screen includes:

a first display portion for displaying current position information of the vehicle;

a second display portion for displaying information of the semiconductor production bay; and a third display portion for displaying information of the semiconductor wafer cassette contained in the vehicle.

25. A computer-readable media storing program instructions, the program instructions disposed on a computer to perform a method for transporting semiconductor wafers in a semiconductor factory automation system, comprising the steps of:

a) processing a lot of semiconductor wafers to be contained in a semiconductor wafer cassette in a process equipment;

b) sending a cassette transportation request from the process equipment to a cell management server when the process equipment has processed the lot of semiconductor wafers;

c) generating a transportation instruction in response to the cassette transportation request; and d) if the semiconductor wafer cassette is transported from the process equipment to a stocker by an automatic guide vehicle (AGV), simultaneously activating the AGV and the stocker by simultaneously sending the transportation instruction to the AGV and the stocker.

* * * * *